US008946647B2

(12) United States Patent
Cloud et al.

(10) Patent No.: US 8,946,647 B2
(45) Date of Patent: Feb. 3, 2015

(54) SYSTEM AND METHOD FOR IDENTIFYING NON-COOPERATIVE PULSED RADIATION SOURCES IN A FIELD-OF-VIEW OF AN IMAGING SENSOR

(75) Inventors: Eugene L. Cloud, Orlando, FL (US); Alan Rakes, Palm Bay, FL (US); John Bailey, Winter Springs, FL (US)

(73) Assignee: DRS RSTA, Inc., Dallas, TX (US)

( * ) Notice: Subject to any disclaimer, the term of this patent is extended or adjusted under 35 U.S.C. 154(b) by 703 days.

(21) Appl. No.: 13/029,158

(22) Filed: Feb. 17, 2011

(65) Prior Publication Data
US 2012/0211665 A1 Aug. 23, 2012

(51) Int. Cl.
*G01T 1/00* (2006.01)
*G01S 7/48* (2006.01)

(52) U.S. Cl.
CPC .................................. *G01S 7/4804* (2013.01)
USPC ........................................ 250/394; 250/395

(58) Field of Classification Search
USPC .................................................. 250/394, 395
See application file for complete search history.

(56) References Cited

U.S. PATENT DOCUMENTS

| 4,097,155 | A |   | 6/1978 | Appert |
| 4,355,331 | A |   | 10/1982 | Georges et al. |
| 5,227,859 | A |   | 7/1993 | Leib et al. |
| 5,241,608 | A |   | 8/1993 | Fogel |
| 5,287,183 | A | * | 2/1994 | Thomas et al. ............... 348/571 |
| 5,926,217 | A |   | 7/1999 | Peterson et al. |
| 5,953,439 | A |   | 9/1999 | Ishihara et al. |
| 6,097,481 | A |   | 8/2000 | Coffey et al. |
| 6,111,241 | A |   | 8/2000 | English et al. |
| 6,130,705 | A | * | 10/2000 | Lareau et al. ................. 348/144 |
| 6,288,383 | B1 |   | 9/2001 | Urbach et al. |
| 6,323,941 | B1 |   | 11/2001 | Evans et al. |
| 6,341,168 | B1 |   | 1/2002 | Nagasaka et al. |
| 6,396,577 | B1 |   | 5/2002 | Ramstack |
| 6,433,333 | B1 |   | 8/2002 | Howard |
| 6,891,161 | B2 |   | 5/2005 | Ionescu et al. |
| 7,109,468 | B2 |   | 9/2006 | Riches et al. |
| 7,202,511 | B2 |   | 4/2007 | Stapelbrock et al. |
| 7,351,972 | B2 |   | 4/2008 | D'Souza et al. |
| 7,427,732 | B2 | * | 9/2008 | Thomas et al. ............ 250/206.1 |
| 7,541,588 | B2 |   | 6/2009 | Tabirian et al. |
| 2004/0004707 | A1 |   | 1/2004 | DeFlumere |
| 2004/0208340 | A1 |   | 10/2004 | Kirschner |
| 2008/0135757 | A1 |   | 6/2008 | D'Souza et al. |
| 2012/0187838 | A1 | * | 7/2012 | Hanna ............................. 315/76 |

\* cited by examiner

*Primary Examiner* — David Porta
*Assistant Examiner* — Gisselle Gutierrez
(74) *Attorney, Agent, or Firm* — Kilpatrick Townsend & Stockton LLP

(57) ABSTRACT

A system and method for identifying a pulsed radiation source may include an imaging sensor having a frame rate that is less than a pulse repetition frequency (PRF) of the pulsed radiation source. A processing unit may be in communication with the imaging sensor, and be configured to (i) process a sequence of image data of a scene captured by the imaging sensor to determine whether radiation of the pulsed radiation source is detected, (ii) determine a PRF code of the pulsed radiation source from possible multiple different PRF codes based on the processed sequence of image data, and (iii) notify a user of the PRF code or information associated with the PRF code.

20 Claims, 15 Drawing Sheets

TABLE OF MAXIMUM WAIT TIMES

|  | τ1 | τ2 | τ3 | ... | τn |
|---|---|---|---|---|---|
| σ1 |  |  |  | ... |  |
| σ2 |  |  |  | ... |  |
| σ3 |  |  |  | ... |  |
| ⋮ | ⋮ | ⋮ | ⋮ | ⋮ | ⋮ |
| σm |  |  |  | ... |  |

TABLE OF MAXIMUM WAIT TIMES

1002a

|  | τ1 | τ2 | τ3 | ... | τn |
|---|---|---|---|---|---|
| σ1 |  |  |  | ... |  |
| σ2 |  |  |  | ... |  |
| σ3 |  |  |  | ... |  |
| ⋮ | ⋮ | ⋮ | ⋮ | ⋮ | ⋮ |
| σm |  |  |  | ... |  |

1002n

B: ROW THAT HAS THE SMALLEST WAIT TIME CORRESPONDS TO THE OPTIMAL IR FRAME RATE σ

A: FIND THE SMALLEST WAIT TIME FOR EACH LASER PULSE REPETITION RATE τ

FIG. 10

SYSTEM AND METHOD FOR IDENTIFYING NON-COOPERATIVE PULSED RADIATION SOURCES IN A FIELD-OF-VIEW OF AN IMAGING SENSOR

BACKGROUND

As military systems developers have increasingly improved precision of weapons and surveillance systems, the use of pulsed energy or radiation sources has been a key component in achieving improved precision. Generally speaking, pulsed radiation sources include lasers that operate with a given pulse rate and pulse width. Different pulsed radiation sources use different pulse rates and pulse widths.

Military personnel, whether acting offensively or defensively, utilize sensing equipment to assist with offensive and defensive military operations. From an offensive perspective, one operation for which military personnel use sensing equipment is to monitor targets that are being targeted by remote pulsed radiation sources to ensure the correct target is being illuminated. Targets are generally illuminated by pulsed radiation sources either by the weapons system itself or personnel on the ground for the weapons system to target. From a defensive perspective, one operation for which military personnel use sensing equipment is to detect pulsed radiation sources from potential enemy weapons, thereby providing military personnel to take preemptive action.

With regard to FIG. 1, a military field environment 100 shows field personnel 102 using a camera 104 for viewing a scene 106 in which military equipment 108a and 108b (collectively 108) being targeted by a helicopter 110 using a pulsed radiation source, such as a laser, to track and provide guidance for a weapons system. Typical pulsed radiation sources have a very short duty cycle relative to their pulse rate. For example, a laser or LED with less than one microsecond (μs) pulse width and pulse repetition frequency of 15 Hz may be typical of a pulsed radiation source.

Historically, cameras used to detect pulsed radiation sources have used a single sensor that is separate from the imaging sensor system. The single sensors are generally avalanche photo diodes (AVP) or pin diodes, which are analog sensors. The inclusion of a separate sensor from an imaging sensor results in increased camera weight and power consumption, both of which are valuable commodities for field personnel. The single sensor typically has a very narrow field-of-view, generally less than 1-degree, and is limited to detecting one laser at a time. In addition, the single sensor that needs to be boresighted or otherwise calibrated to the imaging system of the camera. Using a camera with the single sensor to detect pulsed radiation sources results in these problems and other operational limitations for field and other military personnel.

SUMMARY

To detect and determine characteristics of pulsed radiation sources, a system that uses an imaging sensor for sensing pulsed radiation sources and processes image data captured by the imaging sensor is provided. By using the imaging sensor rather than a single, separate sensor from the imaging sensor to detect a pulsed radiation source, the system has increased field-of-view, weighs less, consumes less energy, and is capable of tracking multiple pulsed radiation sources simultaneously.

One embodiment of a system for identifying a pulsed radiation source may include an imaging sensor and processing unit in communication with the imaging sensor. The processing unit may be configured to (i) process a sequence of image data of a scene captured by the imaging sensor to determine whether radiation of the pulsed radiation source is detected, (ii) determine a PRF code of the pulsed radiation source from possible multiple different PRF codes based on the processed sequence of image data, and (iii) notify a user of the PRF code or information associated with the PRF code.

One method for identifying a pulsed radiation source may include processing a sequence of image data of a scene to determine whether radiation of the pulsed radiation source is detected. A pulsed repetition frequency (PRF) code of the pulsed radiation source may be determined from among multiple possible different PRF codes based on the processed sequence of image data. The determined PRF code or information associated with the PRF code may be presented to a user.

One method for configuring a system for detecting a pulsed radiation source with optimized frame rates and wait times may include generating a simulated pulsed radiation source signal having a pulse repetition rate $\tau$ and pulse width $\alpha$. A simulated camera integration signal having a frame rate $\sigma$ and an integration window $\beta$ with phase offset $\delta$ may be generated. A pulsed radiation source search may be simulated by determining if the pulse width $\alpha$ of the simulated pulsed radiation source signal is completely within the integration window $\beta$ for the simulated camera integration signal over a plurality of phase offsets $\delta$ of the integration window $\beta$. A matrix may be created for recording wait times determined for a range of frame rates $\sigma_1$-$\sigma_m$ and range of pulse repetition rates $\tau_1$-$\tau_n$ of a pulsed radiation source being simulated. In response to determining that the pulse width $\alpha$ of the simulated radiation source is completely within the integration window $\beta$ of the simulated camera integration signal, a current wait time may be entered into the matrix in association with the current frame rate $\sigma$ and pulse repetition rate $\tau$. The frame rate $\sigma$ may be stepped. A determination as to whether the frame rate $\sigma$ is less than or equal to $\sigma_m$, and if so, repeat the generating, generating, simulating, and determining and entering steps. Otherwise, the pulse repetition rate $\tau$ may be stepped. A determination as to whether the pulse repetition rate $\tau$ is less than or equal to $\tau_n$, and if so, repeat the generating, generating, simulating, and determining and entering steps. Otherwise, a smallest wait time in each column in the matrix may be identified for each of the pulse repetition rates $\tau_1$-$\tau_n$. Optimal frame rates $\sigma_{opt}$ may be identified for each of the pulse repetition rates $\tau_1$-$\tau_n$ corresponding to the identified smallest wait times. A system for identifying a pulsed radiation source with the optimal frame rates $\sigma_{opt}$ and corresponding identified smallest wait times may be configured.

BRIEF DESCRIPTION

Illustrative embodiments of the present invention are described in detail below with reference to the attached drawing figures, which are incorporated by reference herein and wherein:

FIG. 9 is an illustration of an illustrative maximum wait time table used for collecting maximum wait times determined by the simulation process of FIG. 7A;

FIG. 10 is an illustration of how the maximum wait time table of FIG. 9 may be used to find the optimal IR frame rate to use when searching for each PRR of the pulsed radiation source (e.g., laser);

DETAILED DESCRIPTION

Figure 1:
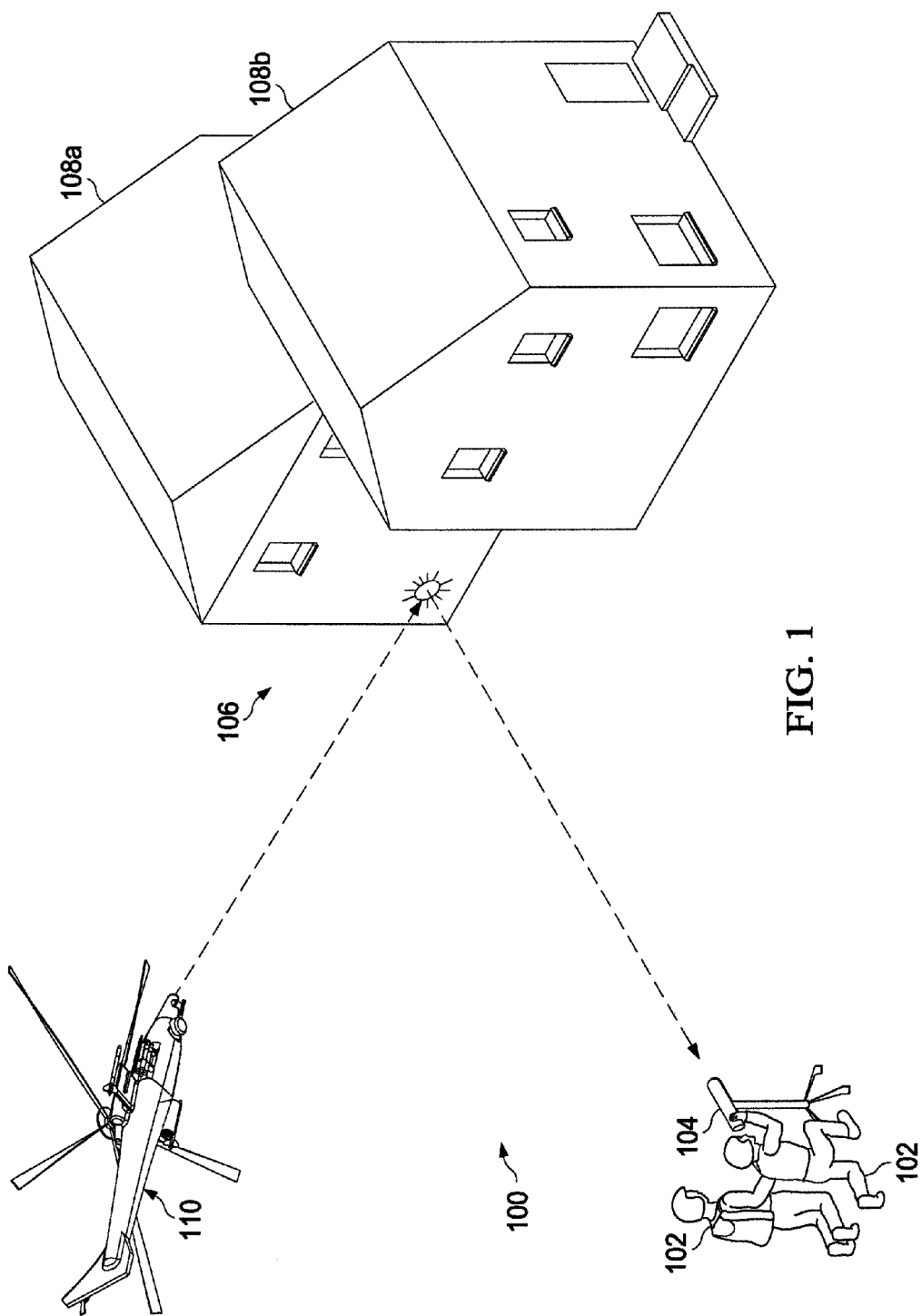
FIG. 1 is an illustration of an illustrative military field environment in which field personnel use a camera system to sense pulsed radiation sources.
Figure 2:
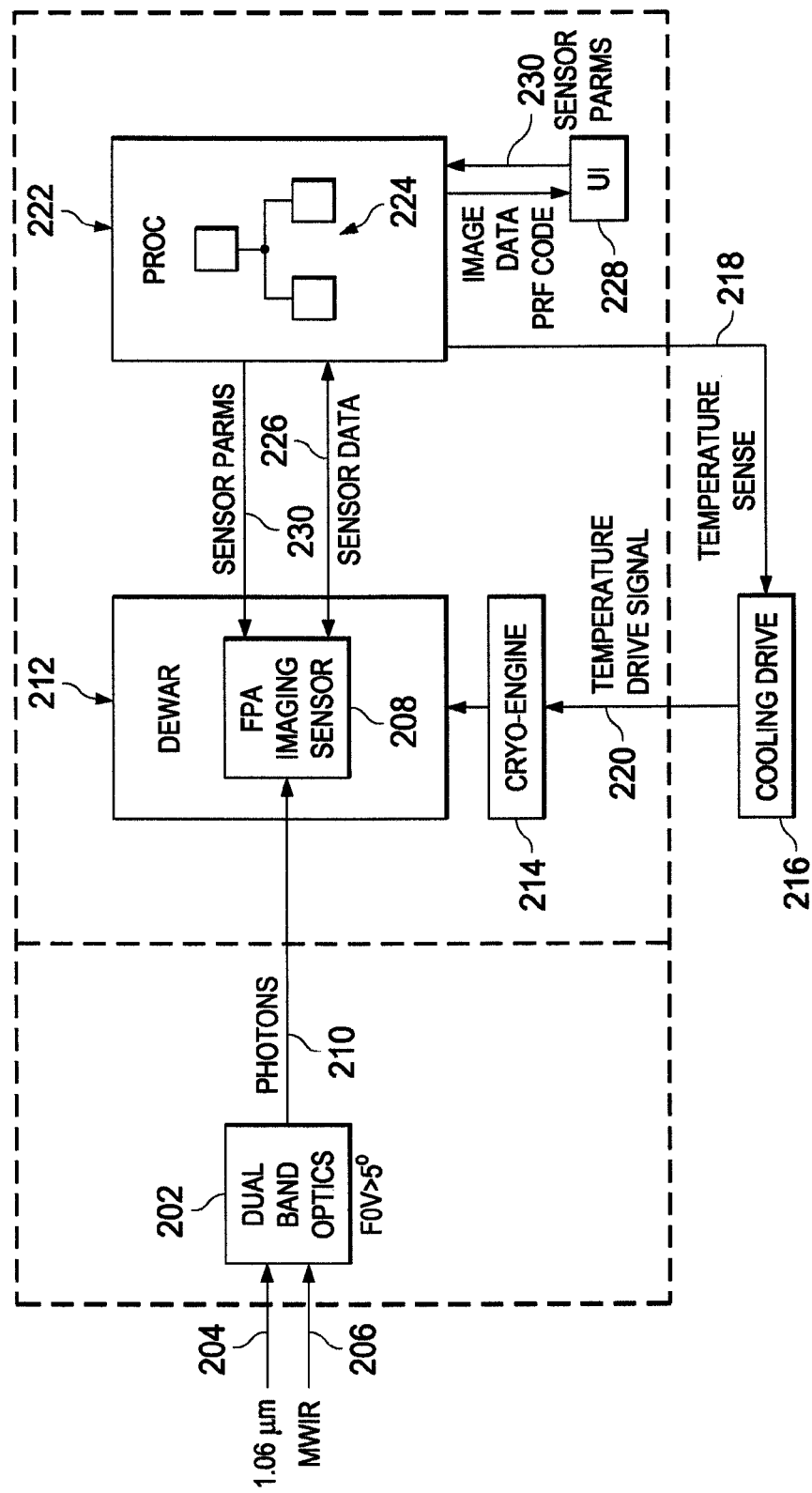
FIG. 2 is a block diagram of electronic components of an illustrative camera system that uses an imaging sensor for sensing a scene and generating image data for use in tracking pulsed radiation sources and determining pulse repetition frequency codes of the pulsed radiation sources.

With regard to FIG. 2, a block diagram of electronic components of an illustrative camera 200 is shown. The camera 200 may be configured to record imaging data of a scene in one or more bands of optical or non-optical frequencies. The term "camera" may be used to describe an electro-optical system that collects or does not collect image data, such as binoculars, telescopes, or any other system that is configured to identify characteristics of pulsed radiation sources. The characteristics of the pulsed radiation sources may include pulse repetition frequency codes of pulsed radiation sources to identify a type of pulsed radiation source that is illuminating a target or other object. The camera 200 may include dual-band optics 202 that are configured to receive an optical signal 204, such as that in the 1.06 micrometer range, and midwave infrared frequency (MWIF) signal 206. In one embodiment, the dual band-optics 202 are configured to provide a field-of-view that is greater than approximately five degrees. It should be understood that the dual-band optics 202 may include multi-band optics configured to operate over more than two frequency bands.

The dual-band optics 202 are configured to illuminate a focal point array (FPA) or imaging sensor 208 with photons 210 representative of a scene being within the field-of-view of the dual-band optics 202. The imaging sensor 208 has a certain number of pixels along azimuth and elevation planes, as understood in the art. In one embodiment, the imaging sensor 208 is configured with 640 pixels along an azimuth direction and 480 pixels along an elevation direction (i.e., 640×480). The imaging sensor 208 may be enclosed within a dewar 212 to maintain the imaging sensor 208 at a temperature at which the imaging sensor 208 is more sensitive to the photons 210 being imaged onto the imaging sensor 208. To control the temperature of the dewar 212, a cryo-engine 214 may be in communication with the dewar 212 to control the temperature of the dewar 212, as understood in the art. A cooler drive 216 may be configured to receive a temperature sense signal 218, which is a feedback signal, and generate a temperature drive signal 220 for the cryo-engine 214. The cryo-engine 214, in turn, drives the temperature of the dewar 212 to regulate temperature of the imaging sensor 208. In an alternative embodiment, the imaging sensor may be an uncooled image sensor.

The camera 200 may further include a processing unit 222 that executes software 224. The processing unit 222 may execute the software 224 to control the imaging sensor frame rate and integration time and to collect and process imaging sensor data 226 that is being collected from the imaging sensor 208. The processing unit 224 may be configured to process the sensor data 226 to detect, identify, and track a pulsed radiation source generating an illumination signal (e.g., laser beam) within the field-of-view of the dual-band optics 202 that are being imaged onto the imaging sensor 208. The software 224 may further be configured to determine characteristics of the pulsed radiation sources, such as a pulse repetition frequency (PRF) or pulse repetition rate (PRR), which, as understood in the art, are inverses of one another, codes of the pulsed radiation source being tracked, and present the PRR or PRF to a user. Based on the PRF or PRR, a PRF code number identifying the pulsed radiation source being used to generate the illumination source may be determined and presented to the user.

As understood in the art, the imaging sensor 208 may have a variety of sensor parameters that are used to control functional operation of the imaging sensor 208. The sensor parameters may include (i) frame rate and (ii) integration time that creates an "electronic shutter" (i.e., the length of time that the imaging sensor 208 is allowed to sense external image signals over one or more frequency bands). In addition, the imaging sensor 208 may be configured to operate in a "snap-shot" mode, where every pixel detector in the imaging sensor turns on and turns off at the same time. A user of the camera 200 may interact with a user interface 228 to set sensor parameters 230 for configuring the imaging sensor 208. The user interface 228 may include knobs, buttons, touch screen display, remote control, or any other mechanical and/or electrical user interface that allows for selecting one or more sensor parameters to configure operation of the imaging sensor 208. In addition, the user interface 228 may include an electronic display (see FIGS. 18A and 18B) that is capable of displaying image data and PRF code(s) that are detected in the image data.

In one embodiment, the image data may include an actual image of a scene of which the dual-band optics 202 are capturing. In addition, the image data being displayed on the user interface 228 may include pulsed radiation source information showing coordinates (e.g., azimuth, elevation, range) on the imaging sensor 208 and/or of a location within the scene at which radiation (e.g., optical signal) is being reflected from an object (e.g., building) or from the pulsed radiation source directly. The coordinates within the scene may be geographic coordinates, which include relative coordinates in any coordinate format (e.g., Cartesian) from the camera itself. More specifically, the geographic coordinates define a location at which the pulsed radiation source is illuminating (e.g., on the side of a building) or at the pulsed radiation source itself (e.g., at the weapons system). Still yet, the user interface 228 may be configured to display both image data and representative pulsed radiation source data (e.g., icon or other indicia) to better indicate to a user a specific target or object that the pulsed radiation source is illuminating. If more than one pulsed radiation source is being tracked, then the user interface 228, in response to receiving more than one pulsed radiation source code, may display the pulsed radiation source codes in a list or in association with an indicator on the user interface 228.

Figure 3:
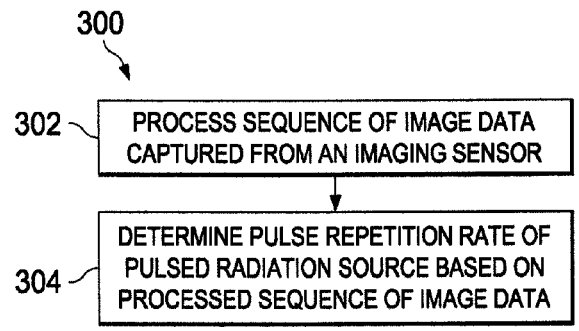
FIG. 3 is a flow diagram of an illustrative process for processing image data to determine a pulse repetition rate of a pulsed radiation source.

With regard to FIG. 3, a flowchart of an illustrative process 300 for processing image data and determining pulse repetition rate of a pulsed radiation source is shown. The process 300 starts at step 302, where a sequence of image data captured from an imaging sensor is processed. The sequence of image data may include multiple, sequential frames that are being collected by the imaging sensor of a scene within the field-of-view of the imaging sensor. The frames of image data may be captured at a certain frame rate and integration window, as configured by sensor parameters that are set by a user or manufacturer. At step 304, a pulse repetition rate or frequency of a pulsed radiation source may be determined based on a processed sequence of image data. The pulse repetition rate or frequency may be displayed to a user to determine a particular type of pulsed radiation source that is being used to target or otherwise illuminate a structure or object. In one embodiment, a pulsed radiation rate, sometimes called pulsed repetition frequency code or simply PRF code, that identifies the pulsed radiation source generating a pulsed radiation signal may be determined based on the determined pulse repetition rate. In another embodiment, rather than displaying the pulse repetition rate, the pulse repetition frequency code or other characteristic or identifier of the pulsed radiation source may be displayed.

Figure 4:
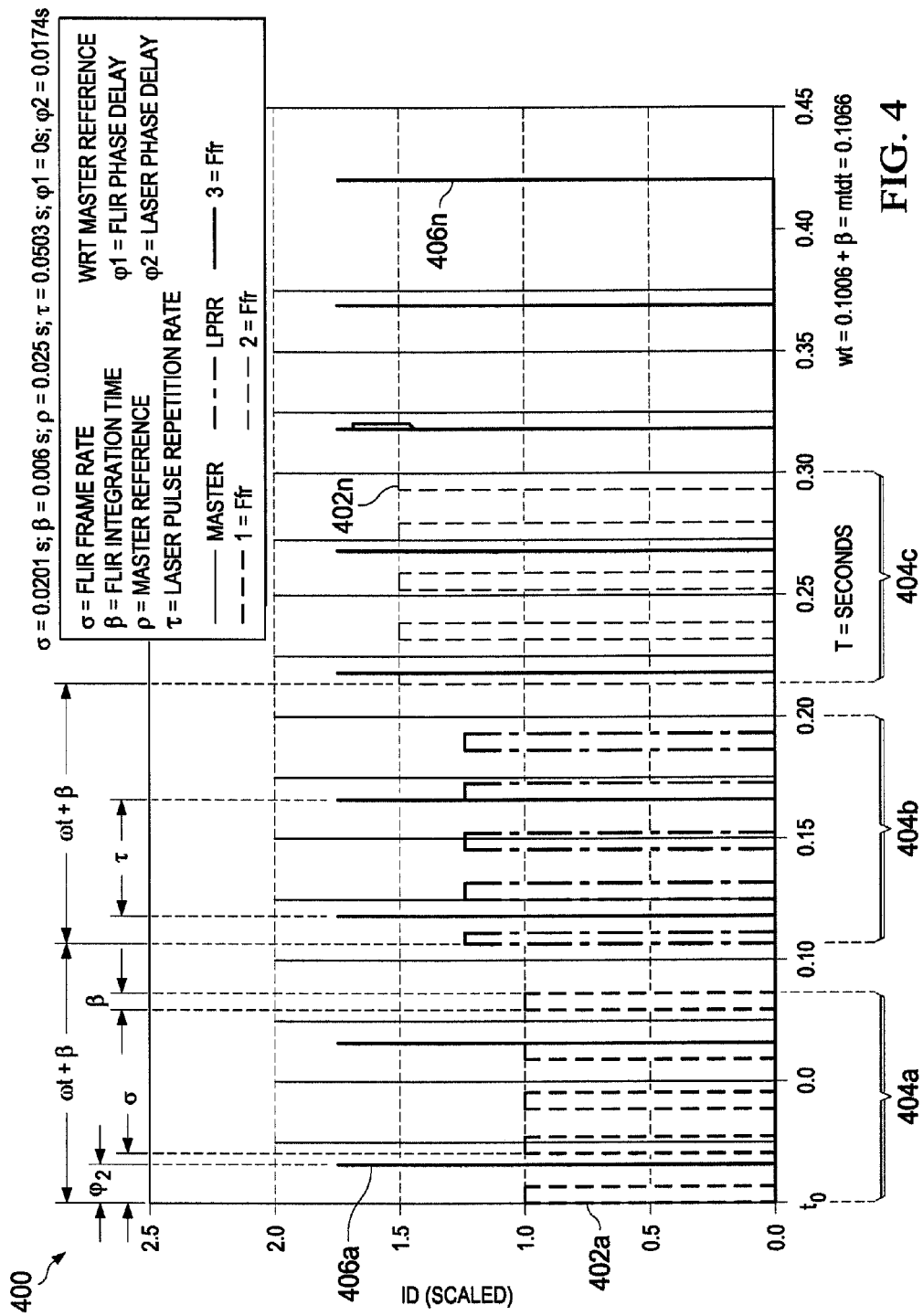
FIG. 4 is a graph of illustrative signals that are used to illustrate sensing parameter definitions that may be used by a tracking system to detect radiation produced by a pulsed radiation source in accordance with the principles of the present invention.

FIG. 4 is a graph 400 of illustrative sensor signals and pulsed radiation source signals that are used to illustrate variable definitions that define both the pulse radiation source signals and sensor signals. The graph 400 includes a series of integration windows 402a-402n (collectively 402) that are arranged in integration window sets 404a, 404b, and 404c generated by an imaging sensor. Although shown as different amplitudes, the integration windows 402 of the integration window sets 404a, 404b, and 404c may each have the same amplitudes. Also shown on the graph 400 are a series of pulsed radiation source signals 406a-406n (collectively 406) produced by a pulsed radiation source, such as a laser. The series of integration windows 402, although shown as five integration windows in each of the integration window sets 404a, 404b, and 404c, may have a different number of integration windows for each set depending upon a minimum wait time determined to provide for unambiguous verification of a frequency of the pulsed radiation source signals 406. For example, rather than having five integration windows for each of the integration window sets 404a, 404b, and 404c, the number of integration windows may be eight, for example, depending upon what variables or parameters are being used by both a tracker system and pulsed radiation source, as further described herein with regard to FIG. 7A.

Continuing with FIG. 4, a number of different variables or parameters are used to define the pulsed radiation source signals 406. The parameters include (i) frame rate $\sigma$, (ii) integration time $\beta$, (iii) imaging sensor phase delay $\phi_1$, (iv) master reference $\phi$, (v) pulsed radiation source phase delay $\phi_2$. A frame rate $\sigma$ is the time or frequency between the start of integration windows. Integration time $\beta$ defines a time of each of the integration windows. An imaging sensor phase delay $\phi_1$, which in this case is zero since the first integration window 402a is aligned with $t_0$ defines a start delay from time $t_0$. A pulsed radiation source phase delay $\phi_2$, which in this case is 0.0174 seconds, defines a start delay from time $t_0$. A master reference $\phi$ may be used as a master clock and set at a base value, such as 0.1 ms. Each of the integration window sets 404 operate for enough time to detect a pulse of the pulsed radiation source if the tracker system is in phase with the pulsed radiation source. In the event that the tracker system does not detect a pulse of the pulsed radiation source within an integration window set, then a phase offset, which is a time delay in starting a next integration window set (e.g., integration window set 404b) from the previous integration window set (e.g., integration window set 404a), may be applied. By phase shifting the integration window sets, a determination may be made as to whether phase or frequency is to be adjusted to determine a pulse repetition rate or frequency of the pulsed radiation source.

Figure 5A:
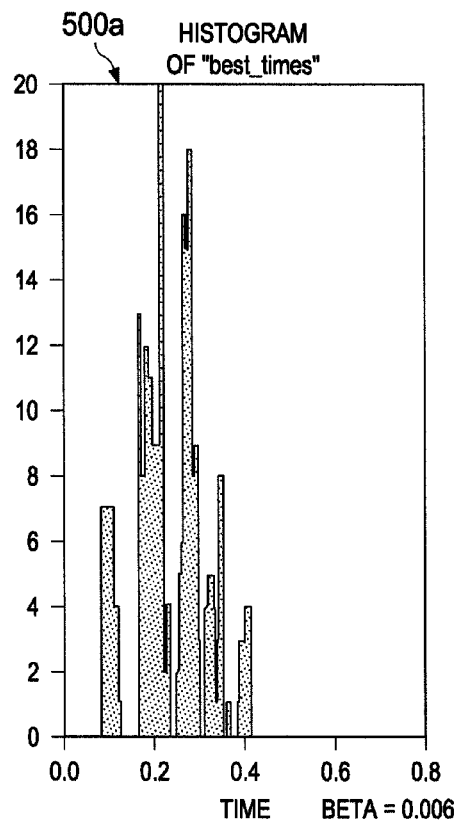
FIGS. 5A and 5B are graphs of illustrative best and worst wait times for a sensing system (e.g., FIG. 2) to determine whether a tracking system has correctly matched frequency and phase of a pulsed radiation source.
Figure 5B:
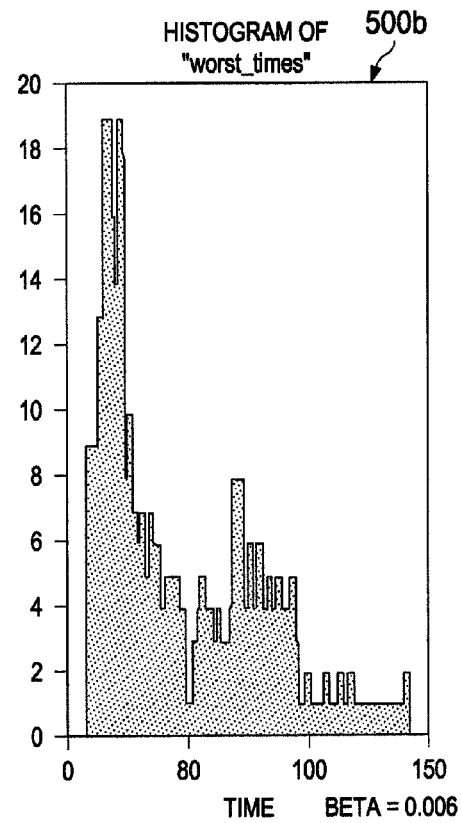

With regard to FIGS. 5A and 5B, respective charts 500a and 500b showing histograms of best (i.e., shortest) times and worst (i.e. longest) times for being able to conclusively determine a pulse repetition rate of a pulsed radiation source are shown. As shown in FIG. 5A, times for conclusively determining pulse repetition rate of a pulse radiation source range from approximately 0.1 seconds to approximately 0.4 seconds, while times shown in FIG. 5B range from approximately 10 seconds to nearly 150 seconds. The difference between the best times of FIG. 5A and worst times of FIG. 5B is the result of predetermining optimal frame rates of the imaging sensor for pulse repetition rates of pulsed radiation sources in accordance with the principles of the present invention. In determining optimal frame rates, a software simulation (see FIG. 7A) may be run for each pulse repetition rate of the pulsed radiation sources to determine which frame rates were able to acquire or conclusively determine the pulse repetition rate the fastest and the amount of time it took for conclusively making the determination (i.e., minimum wait time).

Figure 6A:
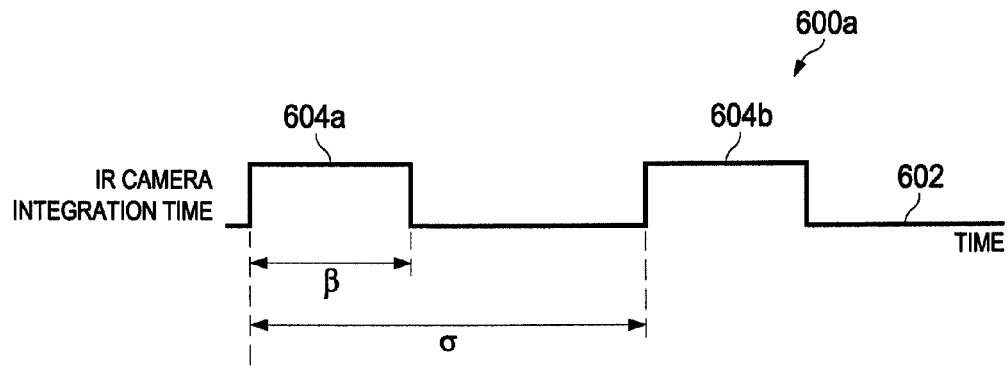
FIGS. 6A-6C (collectively FIG. 6) are graphs of illustrative IR frame window parameter definitions for use in sensing pulsed radiation sources with particular pulse repetition frequencies, and as used herein.

With regard to FIG. 6A, a graph 600a of an illustrative IR integration window signal 602 showing two IR integration windows 604a and 604b. Each of the integration windows 604a and 604b have a pulse width of $\beta$ and operate at a frame rate of $\sigma$. The pulse width $\beta$ and frame rate $\sigma$ are used in determining minimum wait times, as calculated by the process of FIG. 7A.

Figure 6B:
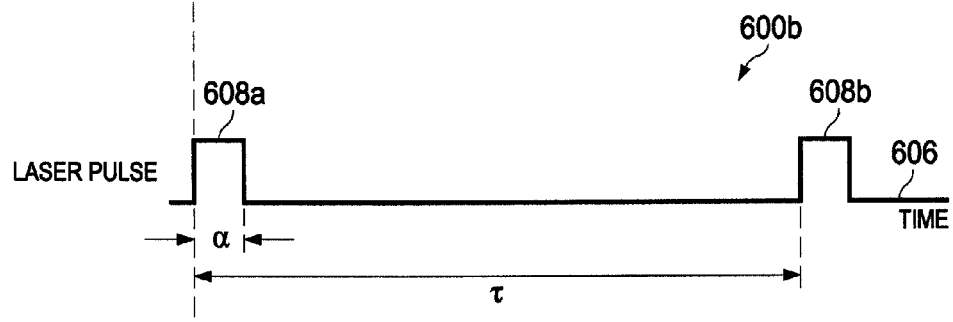

With regard to FIG. 6B, a graph 600b of an illustrative pulsed radiation source signal 606 showing two pulsed radiation source signal pulses 608a and 608b. Each of the pulsed radiation signal pulses 608a and 608b have a pulse width of $\alpha$ and operate at a pulse repetition rate of $\tau$. The pulse width $\chi$ and pulse repetition rate $\tau$ are used in determining minimum wait times, as calculated in the process of FIG. 7A. As shown, both the IR integration window signal 602 and pulsed radiation source signal 606 are synchronized in that the IR integration window 604a and pulsed radiation source pulse 608a each start at time $t_0$. It should be understood, however, that it is rare that a tracker system is initially synchronized with the pulsed radiation source. Typically, the IR integration window 604a is offset from the pulsed radiation source signal pulse 608a.

Figure 6C:
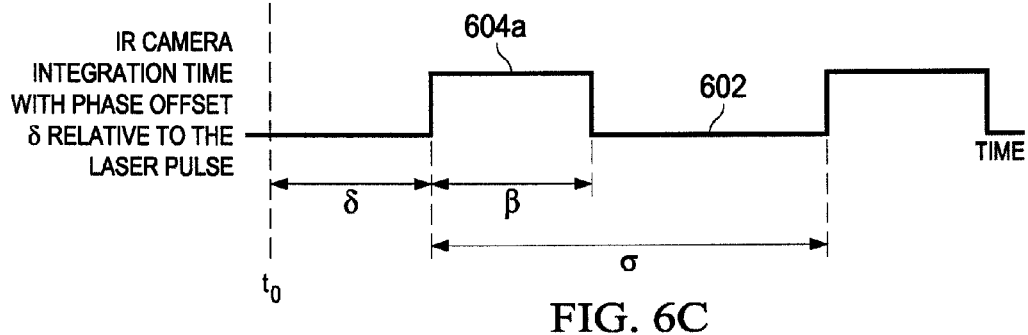

With regard to FIG. 6C, the IR integration window signal 602 is shown to have a delay of $\delta$, which causes the first integration window 604a to not be aligned with the pulsed radiation source pulse 608a of FIG. 6B. The delay $\delta$ is varied in the process of FIG. 7A in an attempt to identify a pulse of the pulsed radiation source (FIG. 6B).

With further regard to FIG. 6C, it should be understood the $\alpha$ is typically very short with respect to $\beta$. And since the separation in time of neighboring $\tau$-repetition rates (typically separated by 0.001 seconds) allows for more than one $\tau$-valued signal to appear within the $\beta$-window, the continued detection of the pulse at every expected opportunity is observed over a period of time in order to confirm the correct $\tau$ has been detected. If the pulse source of $\tau$-value differs from the expected value, then the pulse, over time, will appear to walk out of the $\beta$-window. The length of time for the pulse to exit the $\beta$-window and the direction in which it exits (beginning of $\beta$-window or end of $\beta$-window) is a function of $\beta$, $\sigma$, and $\tau$. TABLE I shows the additional confirmation wait-times used to separate a $\tau \pm 0.001$ seconds from the expect $\tau$. TABLE I further shows wait-time (seconds) for various laser code samples used to confirm that the $\tau$ is correct and not ± one code offset.

TABLE I

Laser Delay/Laser Pulse Code

| | | Laser Pulse Code | | | | | |
|---|---|---|---|---|---|---|---|
| | | 100 | 200 | 300 | 384 | 385 | 386 | 400 |
| Laser | 0 | 3.63 | 4.24 | 5.52 | 6.03 | 3.02 | 3.03 | 3.11 |
| Delay | 0.001 | 3.03 | 3.54 | 4.60 | 5.03 | 2.52 | 2.53 | 2.60 |
| (sec) | 0.002 | 2.43 | 2.84 | 3.69 | 4.03 | 2.12 | 2.03 | 2.08 |
| | 0.003 | 1.89 | 2.21 | 2.86 | 3.13 | 3.12 | 1.62 | 1.67 |
| | 0.004 | 2.49 | 2.91 | 3.78 | 4.13 | 4.12 | 2.13 | 2.19 |
| | 0.005 | 3.09 | 3.61 | 4.69 | 5.13 | 5.13 | 2.63 | 2.70 |
| | 0.005999 | 3.63 | 4.24 | 5.52 | 6.03 | 6.03 | 3.03 | 3.11 |

Figure 7A:
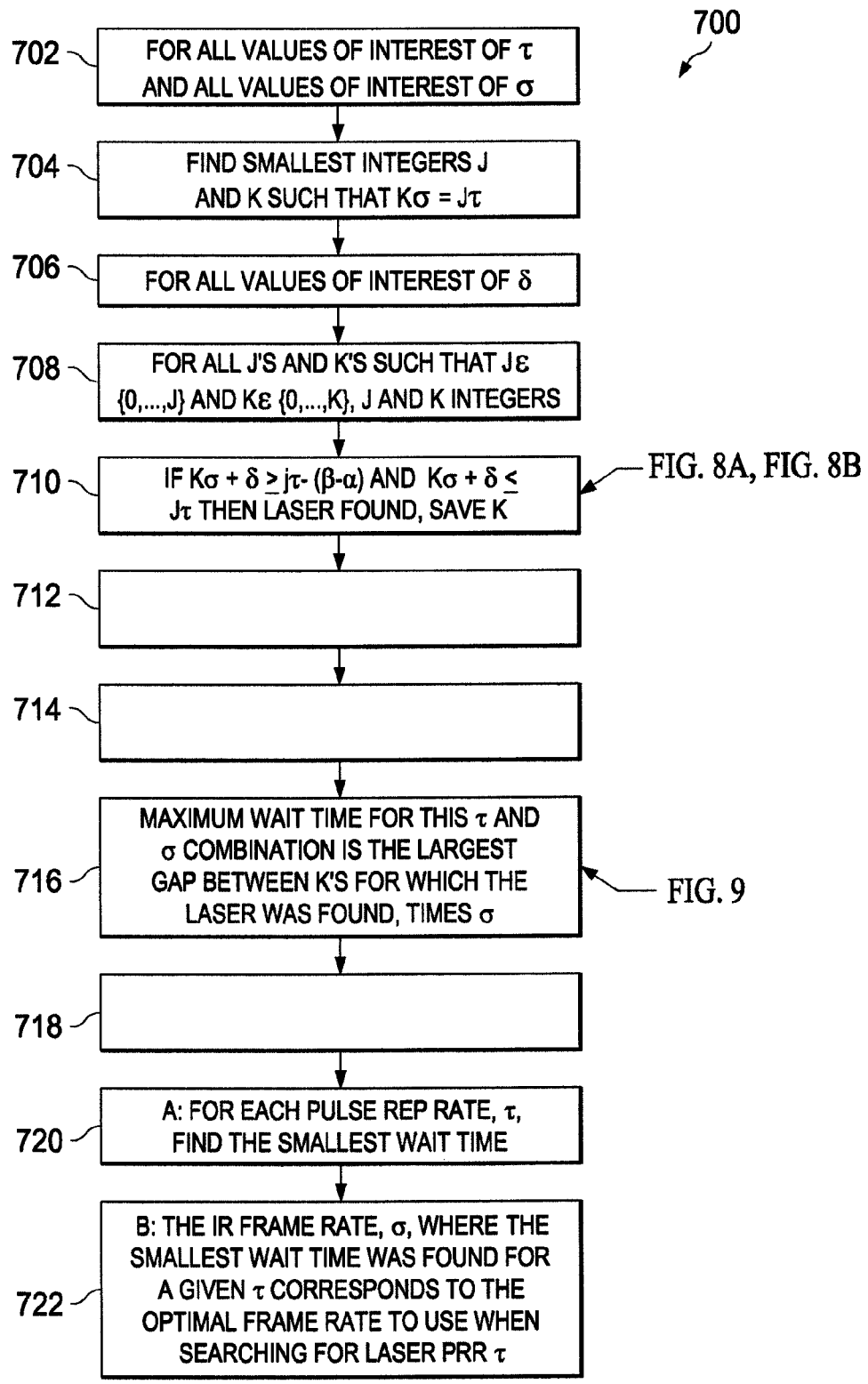
FIG. 7A is a flow diagram of an illustrative process for simulating and calculating wait times for a tracking system to conclusively determine pulse repetition rate of a pulsed radiation source.

With regard to FIG. 7A, a flow chart of an illustrative process 700 for simulating and calculating wait times for a tracking system to conclusively determine pulse repetition rate of a pulsed radiation source is shown. "Wait time" is used when searching for an IR frame rate that enables the user to see the laser pulse. Wait time refers to the amount of time the video stream is monitored for a pulsed radiation source after setting the IR frame rate ($\sigma$) and the IR frame rate phase shift ($\delta$) to new values. It should be understood that the wait time may be defined by numbers of frames or other video parameter as opposed to units of time (e.g., seconds). The process 700 starts at step 702, where a loop of all values of interest of $\tau$ and all values of interest of $\sigma$ starts. At step 704, a process is started to find the smallest integers of J and K such that $K\sigma = J\tau$. As an example, if $\tau = 100$ and $\sigma = 25$, using basic algebra, $\tau/\sigma = 100/25 = 4$, which provides for the smallest integers for J and K to be K/J = 4/1 = 4.

At step 706, a loop starts for all values of interest of $\delta$ (i.e., delay). It should be understood that $\delta$ increments may be based on clock rate, camera resolution, and/or other physical parameters of the tracking system. At step 708, a third loop starts for all j's and k's, such that j ranges from 0 to J and k ranges from 0 to K, where j and k are integers. At step 710, a determination may be made as to whether $k\sigma + \delta \geq j\tau - (\beta - \alpha)$ and whether $k\sigma + \delta \leq j\tau$. If so, then it is determined that a pulsed radiation source signal is found during an integration window, as demonstrated in FIGS. 8A and 8B. If a pulsed radiation source signal is found at any step of k, then that step value of k is saved.

Figure 8A:
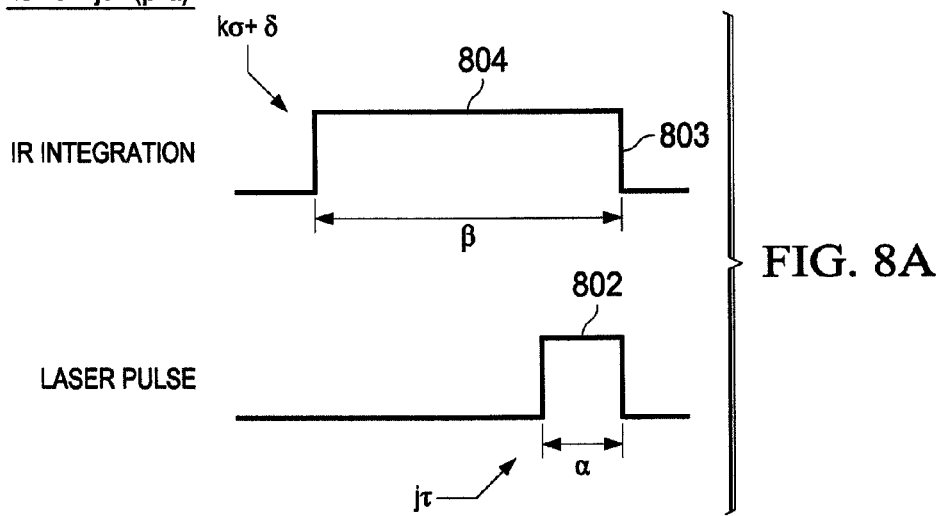
FIGS. 8A and 8B are illustrative IR integration windows and pulsed radiation sources used for illustrating when a pulsed radiation source is detected in an IR integration window.

With regard to FIG. 8A, illustrative integration window and pulsed radiation source signals 800a are shown to demonstrate the equation of $k\sigma + \delta = j\tau - (\beta - \chi)$, which determines whether a pulsed radiation source signal pulse 802 is within a right-most edge 803 of an integration window 804. The start time of the pulsed radiation source signal pulse 802 is determined by $j\tau$ and integration window 804 is determined by $k\sigma + \delta$.

Figure 8B:
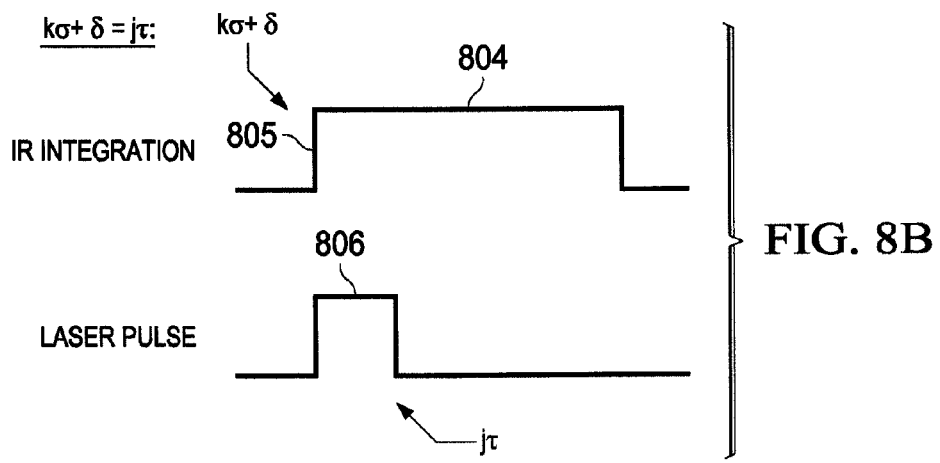

With regard to FIG. 8B, illustrative integration window and pulsed radiation source signals 800b are shown to demonstrate the equation $k\sigma + \delta = j\tau$, which determines whether a pulsed radiation source signal pulse 806 is within a left-most edge 805 of the integration window 804. As with FIG. 8A, the start time of the pulsed radiation source signal pulse 806 is determined by $j\tau$ and integration window 808 is determined by $k\sigma + \delta$.

Continuing with FIG. 7A, at step 712, if j<J or k<K, then the process 700 loops back to step 708 and the loop continues to repeat until both j=J and k=K. If j=J and k=K, then the process 700 continues at step 714, which determines whether all values of interest of $\delta$ (i.e., time delay) have been tested. If not, then the process 700 loops back to step 706 to step $\delta$ to a next value and repeats the inner loop. Once all values of interest of $\delta$ have been processed, the process continues to step 716. At step 716, a determination of the maximum wait time for the current $\tau$ and $\sigma$ combination is made. The largest wait time is determined as the largest gap between k's that are saved. As an example, if within a j loop, where j=1, if it is determined at k=1, 3 and 4 that a pulsed radiation source signal pulse is within an integration window, then k=1, 3, and 4 are saved. The largest gap between the saved k's is 2 (i.e., (k=3)−(k=1)=2), which is multiplied by $\sigma$ and stored in the corresponding cell for $\sigma$ and $\tau$ (e.g., upper left cell corresponding to cell $\sigma$1 and $\tau$1 (see FIG. 9)). At step 718, if additional value of $\tau$ and $\sigma$ exist, then the process returns to step 702 to repeat for all values of interest of $\tau$ and $\sigma$.

Figure 11:
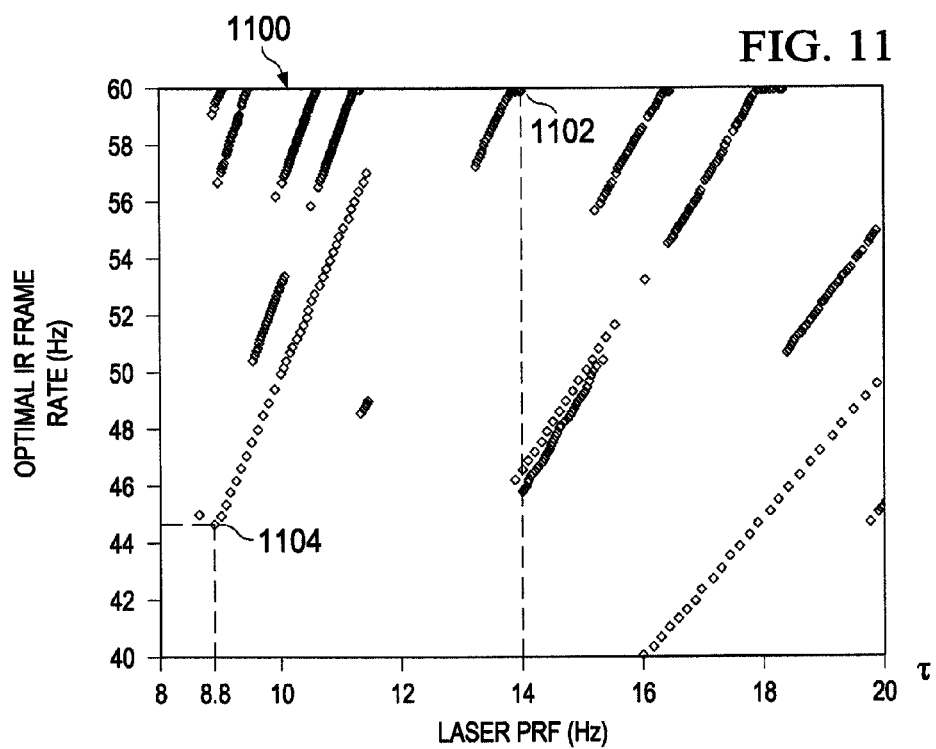
FIG. 11 is a graph of illustrative optimal frame rates for each pulse repetition rate of pulsed radiation sources produced by the simulation of FIG. 7A.

With regard to FIG. 11, an illustrative graph 1100 provides optimal frame rates for each given pulse repetition rate or frequency of pulsed radiation sources. The United States uses a certain number of pulse repetition frequencies for various pulsed radiation sources, and each one of those frequencies ranges over certain frequencies. In identifying and synchronizing with the different pulsed radiation sources by a tracking system, optimal frame rates as determined by the simulation provided in FIG. 7A may be utilized.

Two scenarios exist when using a tracking system for detecting pulsed radiation sources, (i) knowing what PRF is being used by the pulsed radiation source, and (ii) not knowing what PRF is being used by the pulsed radiation source. No matter which one of the two scenarios exists in the field, the optimal frame rate may be used to most quickly detect, identify, and track the pulsed radiation source. As an example, with a pulsed radiation source having a PRF of $PRF_1$ Hz, a corresponding optimal frame rate is defined by point 1102, which is F+20 Hz. It should be understood that each laser PRF shown on the chart 1100 has a single optimal frame rate associated therewith. The optimal frame rates are data points generated by the process 700 of FIG. 7A and stored in tables, such as those shown in FIGS. 9 and 10. As another example, in the case in which the frequency of the pulsed radiation source is unknown, the imaging system may select a frame rate in which multiple pulsed radiation source PRFs may be detected using the same frame rate of the imaging sensor. Alternatively, the system may start at a lowest PRF and step its way up the certain number of different PRFs until the correct frame rate is determined. As shown, the lowest PRF is approximately $PRF_2$ Hz, which corresponds to an optimal frame rate of approximately F+4.4 Hz at point 1104.

Figure 12:
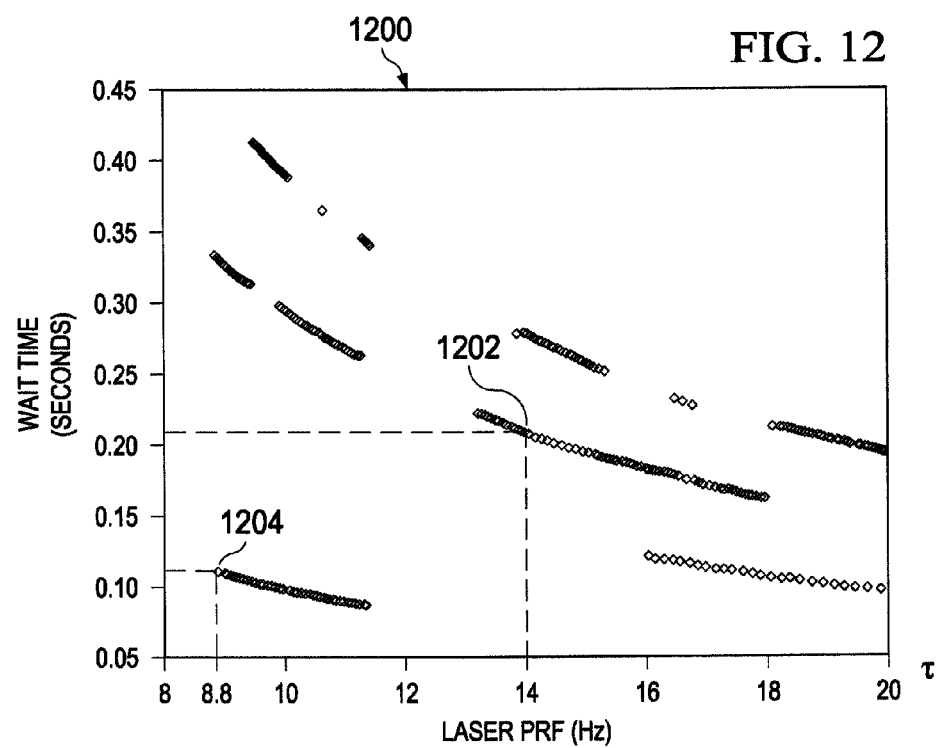
FIG. 12 is a graph of illustrative wait times for each pulse repetition rate of pulsed radiation sources produced by the simulation of FIG. 7A.

With regard to FIG. 12 an illustrative graph 1200 showing predetermined wait times for each corresponding pulsed radiation source PRF is shown. Following with the examples of FIG. 11 with a pulsed radiation source PRF of $PRF_1$ Hz, a wait time is predetermined to be set at T+0.16 seconds at point 1202. In addition, a pulsed radiation source PRF of $PRF_2$ Hz is shown to be associated with a wait time of approximately T+0.065 seconds at point 1204. It should be understood that the wait time associated with each pulsed radiation source PRF is computed based on the simulation of FIG. 7A performed to determine how long it takes for each pulsed radiation source PRF to be determined without ambiguity. The wait times are identified in the table of FIG. 10. The wait time provides an amount of time that the system waits before doing a phase shift in an attempt to sense a pulse of the pulsed radiation source during an integration window of the tracking system. During this wait time, a number of integration windows are performed. To determine the number of integration windows, the wait time is divided by the integration window time. For example, a wait time of 16 milliseconds is divided by an integration window of 6 milliseconds, which results in 2.67 integration windows, which is rounded up to an integer of 3 integration windows. In other words, each wait time is to have 3 integration windows before changing phase.

With regard to FIG. 9, an illustrative maximum wait time table 900 of maximum wait times is shown. The table 900 contains time values that are defined by maximum k difference values multiplied by the σ value being tested. The table 900 is filled in at step 716 (FIG. 7A) by maximum wait time values, as described above. The table 900 is used to find the IR frame rate (σ) that minimizes the wait time when searching for each pulsed radiation source PRR (τ).

Continuing with FIG. 7A, at step 720, for each pulse repetition rate τ, the smallest wait time is determined (i.e., smallest value in each column). By finding the smallest wait times, the best of the worst wait times in table 900 (FIG. 9) are identified. At step 722, the frame rate σ at which the smallest wait time was determined at step 720 is determined to correspond to the optimal frame rate to use by the tracking system when searching for a pulse of the pulsed radiation source having a pulse repetition rate of τ. That is, the optimal frame rate σ for each pulse repetition rate τ is the row with the smallest table entry in the column of the current pulse repetition rate τ (i.e., the optimal frame rate to use when searching for a given pulsed radiation source PRR is that frame rate that yields the shortest wait time). It should be understood that some optimal frame rates may correspond to multiple pulse repetition rates τ.

With regard to FIG. 10, an illustrative maximum wait time table 1000 showing smallest wait times at each pulse repetition rate τ of pulsed radiation sources and corresponding optimal frame rates δ of a tracker system are shown be circled cells 1002a-1002n. Using the smallest wait times and corresponding optimal frame rates by the tracking system shortens the amount of time that the tracking system takes to unambiguously identify and track a pulsed radiation source, whether or not the pulse repetition rate is known, as illustrated by FIGS. 5A and 5B.

Figure 7B:
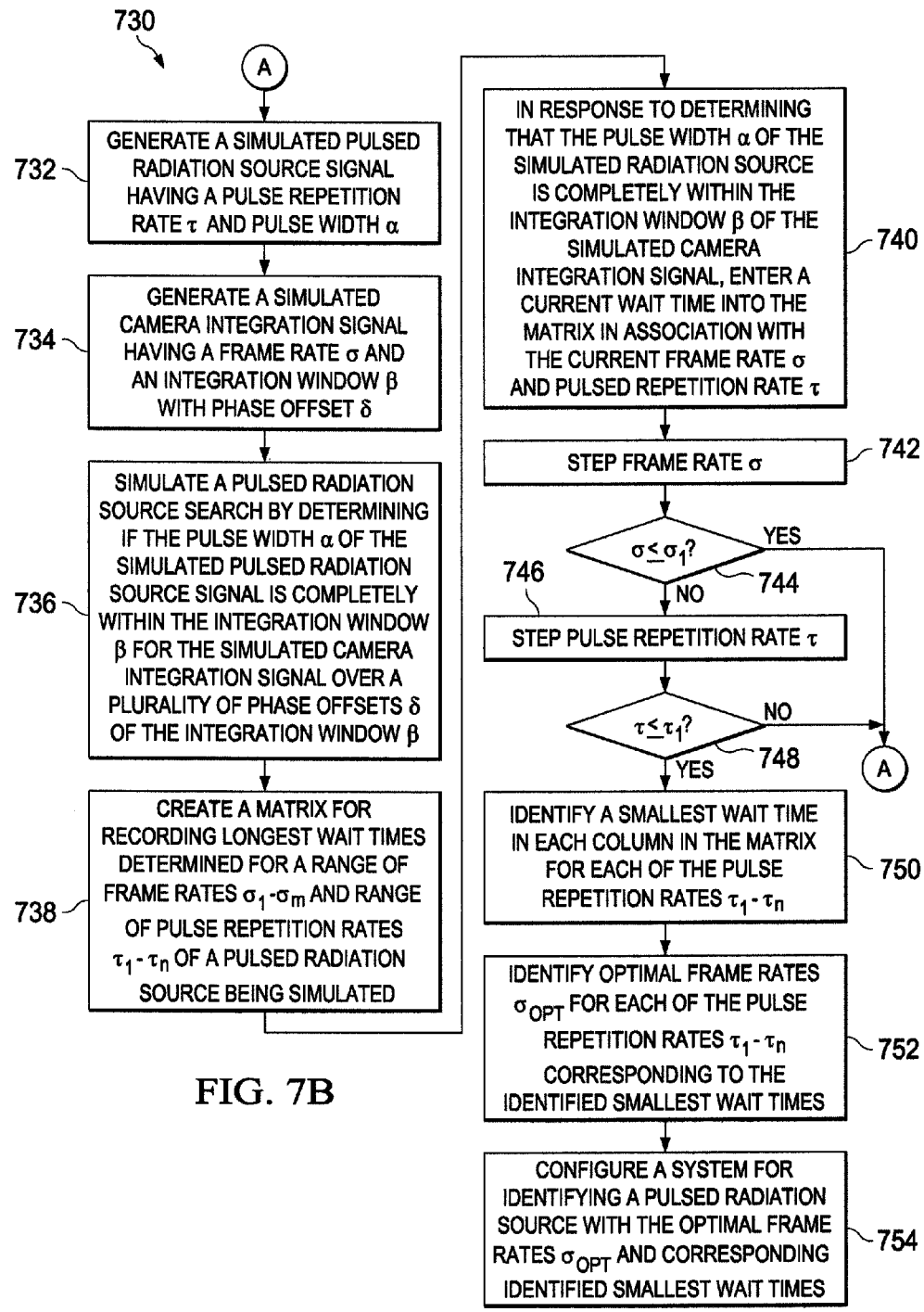
FIG. 7B is a flow diagram of an illustrative process for configuring a system for detecting a pulsed radiation source with optimized frame rates and wait times.

With regard to FIG. 7B, a flowchart of an illustrative process 730 for configuring a system for detecting a pulsed radiation source with optimized frame rates and wait times is shown. The process 730 starts at step 732, whereby a simulated pulsed radiation source signal having a pulse repetition rate τ and pulse width α is generated. The pulse repetition rate τ may be set to a first pulse repetition rate $\tau_1$, as previously described in FIG. 7A, and the pulse width may be set to a known pulse width of pulsed radiation sources. At step 734, a simulated camera integration signal having a frame rate σ and an integration window β with phase offset δ may be generated. The frame rate σ may be set to a first frame rate $\alpha_1$, as previously described in FIG. 7A, and the phase offset may be set to a an integration window β. Alternative values for the phase offset δ may be utilized in accordance with the principles of the present invention.

At step 736, a pulsed radiation source search may be simulated by determining if the pulse width α of the simulated pulsed radiation source signal is completely within the integration window β for the simulated camera integration signal over multiple phase offsets δ of the integration window β. The multiple phase offsets δ means that the integration window β is shifted in time by a phase offset δ. At step 738, a matrix may be created for recording longest wait times determined for a range of frame rates $\sigma_1$-$\sigma_m$ and range of pulse repetition rates $\tau_1$-$\tau_n$ of a pulsed radiation source being simulated. It should be understood that data representations other than a matrix may be utilized and considered equivalent to a matrix.

At step 740, in response to determining that the pulse width α of the simulated radiation source is completely within the integration window β of the simulated camera integration signal, a current wait time may be entered into the matrix in association with the current frame rate σ and pulse repetition rate τ. The frame rate σ may be stepped at step 742. In stepping the frame rate σ, the frame rate σ is stepped from $\sigma_1$-$\sigma_m$ in equal or non-equal increments. At step 744, a determination as to whether the frame rate σ is less than or equal to $\sigma_m$, and if so, repeat generating (step 732), generating (step 734), simulating (step 736), and determining and entering (step 740). Otherwise, the pulse repetition rate τ is stepped. In stepping the pulse repetition rate τ, the pulse repetition rate τ is stepped from $\tau_1$-$\tau_n$ in equal or non-equal increments. At step 748, a determination is made as to whether the pulse repetition rate τ is less than or equal to $\tau_n$, and if so, repeat generating (step 732), generating (step 734), simulating (step 736), and determining and entering (step 740). Otherwise, the process continues at step 750.

At step 750, a smallest wait time in each column in the matrix is identified for each of the pulse repetition rates $\tau_1$-$\tau_n$. At step 752, optimal frame rates $\sigma_{opt}$ are identified for each of the pulse repetition rates $\tau_1$-$\tau_n$ corresponding to the identified smallest wait times. In one embodiment, identifying the optimal frame rates $\sigma_{opt}$ includes identifying from frame rates $\sigma_1$-$\sigma_m$ that identify respective rows of the matrix in which the identified smallest wait times are positioned. A system may be configured for identifying a pulsed radiation source with the optimal frame rates $\sigma_{opt}$ and corresponding identified smallest wait times. The system may be a camera system, weapons system, or any other system that may be utilized to detect radiation of a pulsed radiation source.

Figure 13:
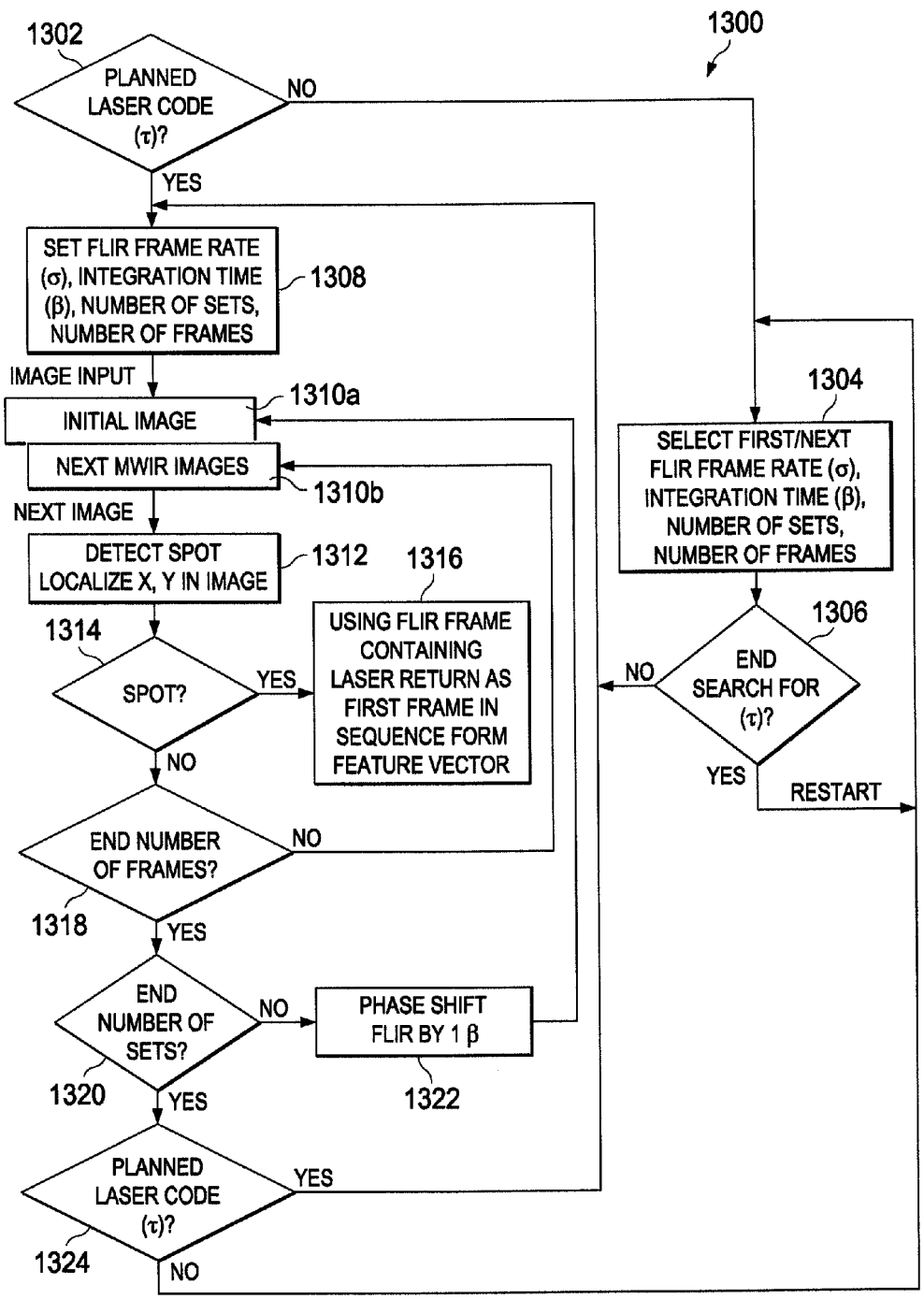
FIG. 13 is a flow diagram of an illustrative process for detecting and processing image data to determine a pulse repetition frequency code of a pulsed radiation source by a field operated weapons or surveillance system.

With regard to FIG. 13, a flowchart of an illustrative process 1300 for detecting and processing image data to determine a pulsed repetition frequency code of a pulsed radiation source the optimal wait times as determined by the process of FIG. 7A is shown. Because the sensor parameters may not cause the imaging sensor to be in sync with pulses or spots of a pulsed radiation source, it is possible that the imaging sensor does not detect the pulsed radiation source at every "snap-shot" of the imaging sensor. Using this principle, the process 1300 may start at step 1302 by a determination being made as to whether or not a planned laser or pulsed repetition rate code ($\tau$) is being used. A planned laser code is used if personnel projecting the pulsed radiation source notifies personnel who are attempting to detect and track the pulsed radiation source. If the laser code is not planned, then the process continues at step 1304, where a first or next FLIR frame rate ($\sigma$), integration time ($\beta$), maximum number of phase shifts, and number of frames are selected. The selection process of step 1304 may be performed manually, semi-automatically (e.g., select one or more settings to cause predetermined other settings to occur), or automatically (e.g., preprogrammed next setting). The process continues at step 1306, where a determination may be made as to whether to end the search for the pulsed repetition rate code ($\tau$). If it is determined at step 1306 that the search for the pulsed repetition rate code ($\tau$) is ended, then the process is restarted and returns to step 1304. Otherwise, the process 1300 continues at step 1308, where the FLIR frame rate ($\sigma$), integration time ($\beta$), number of phase shifts, and number of frames are set. In one embodiment, the parameters (i.e., FLIR frame rate ($\sigma$), integration time ($\beta$), number of phase shifts, and number of frames) may be set by the results of the simulation process 700 of FIG. 7A, thereby minimizing the wait time for an operator attempting to detect, track, and identify the pulsed radiation source. In this case, the number of frames is computed by dividing the wait time from FIG. 10 by the IR frame rate ($\sigma$) and rounding up. The wait time is found in FIG. 10 at the intersection of the current IR frame rate ($\sigma$) with the pulsed radiation source PRR currently being tested for the pulsed repetition rate code ($\tau$).

After the parameters are set at step 1308, image inputs, including an initial image 1310a and next MWIR image(s) 1310b may be collected by a camera being used by the operator to detect, track, and identify the pulsed radiation source, as previously described. At step 1312, spots detected may be localized in the image using x,y coordinates. It should be understood that alternative coordinates may be utilized. If, at step 1314, a determination is made that a spot is detected, then the process continues at step 1316, where the FLIR frame containing a pulsed radiation source spot may be used as a first frame in a sequence of a form feature vector in a process of FIG. 14. Otherwise, the process 1300 continues searching for pulsed radiation source spots using the current set of parameters (see, for example, FIGS. 6A-6C) and continues taking MWIR images 1310b until either (i) a spot is detected, in which case the process 1300 continues through step 1316 to the process of FIG. 14 or (ii) a determination is made at step 1318 that the number of frames has ended, thereby signifying that the camera is not at the correct frequency or phase to match the pulse repetition rate of the pulsed radiation source.

If it is determined at step 1318 that the end of the number of frames is reached, meaning the number of frames for a given FLIR frame rate ($\sigma$) has reached its end without detecting a spot, then the process 1300 continues at step 1322, where phase of the FLIR is shifted by one integration time ($\beta$) (see FIG. 6C). After the FLIR is shifted, another initial image 1310a is taken and the process 1300 cycles again in an attempt to detect a spot so that the process of FIG. 14 can commence. If the process 1300 does not detect a spot, then the process 1300 continues at step 1324, where a determination of whether a planned laser code ($\tau$) is set or not. If so, then the process continues at step 1308. Otherwise, the process continues at step 1304 and the process 1300 repeats for a first set of parameters (step 1308) or next set of parameters (step 1304).

Figure 14:
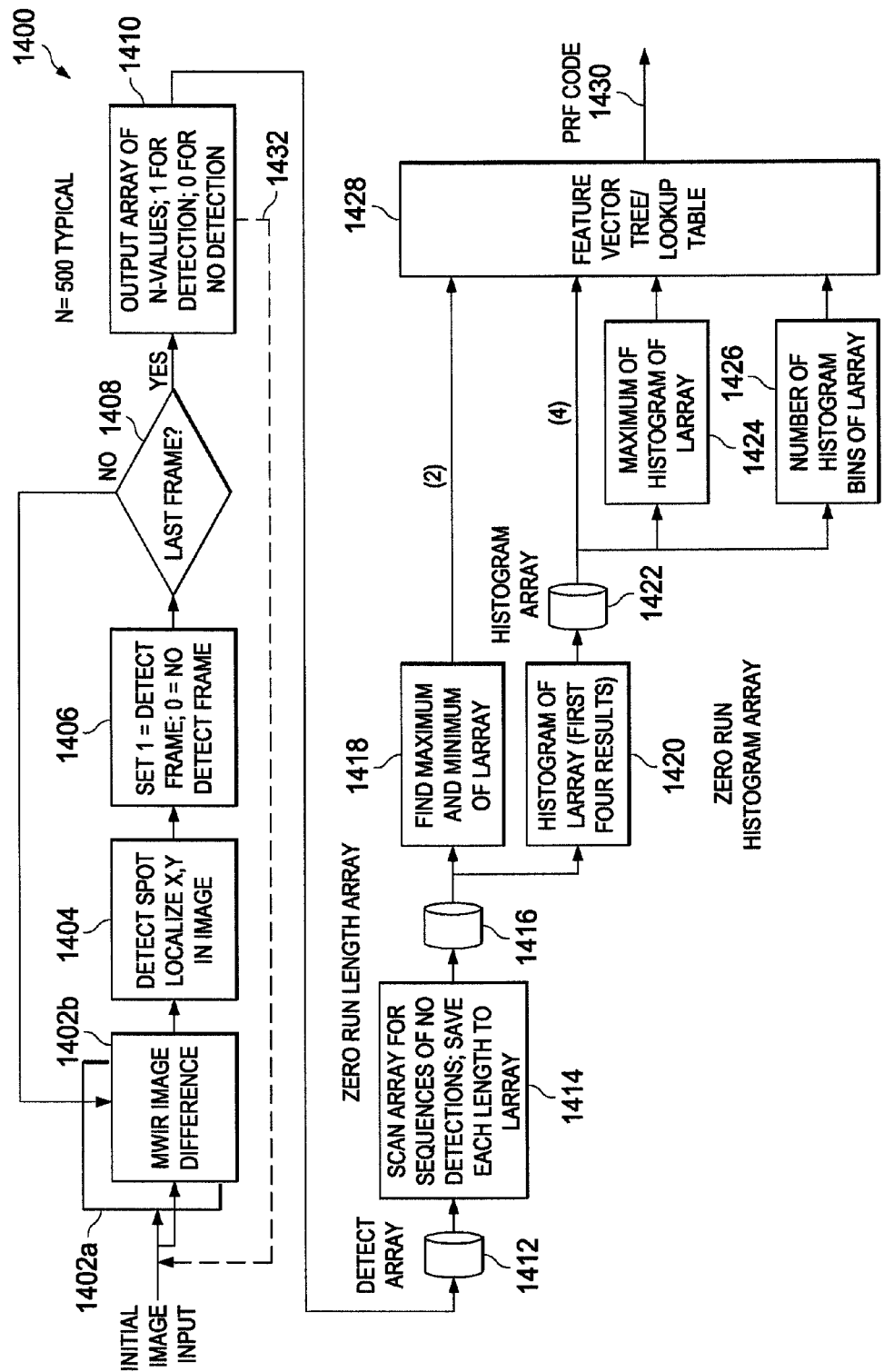
FIG. 14 is a flow diagram of an illustrative process for determining pulse repetition frequency code of a pulsed radiation source by a field operated weapons or surveillance system.

With regard to FIG. 14, a flowchart of an illustrative process 1400 for determining a PRF code of a pulsed radiation source is provided. The process 1400 is initiated in response to a spot being detected by the process 1300 of FIG. 13, where the process 1400 is called by step 1316 with the detected spot of the pulsed radiation source is set in a first frame in a sequence of a form feature vector.

Pulse repetition frequency codes generally range from approximately 8 Hz to slightly more than 19 Hz. Because imaging sensors, such as imaging sensor 208 of FIG. 2, are not analog and do not generate continuous, uninterrupted image data synchronization of the imaging sensor with an unknown PRF code is generally not possible. As such, the principles of the present invention provide for setting parameters for the imaging sensor and using image data collected by the imaging sensor of a scene in which a pulsed radiation source is being used may provide enough information for the camera to accurately determine a particular PRF code from among multiple PRF codes. As understood in the art, there are currently 448 PRF codes from which a camera utilizing the principles of the present invention identifies a PRF code being utilized by a pulsed radiation source. However, the number of PRF codes may change over time, but the principles of the present invention may operate as described herein to accurately determine a particular PRF code from among an increased or decreased number of PRF codes.

The process 1400 is used to process image data 1402 of a scene collected by optics and imaging sensor of a camera once a spot of a pulsed radiation source is detected by the process 1300 of FIG. 13, as previously described. The imaging sensor generates sequential frames of sensor data, which may be examined as pairs of sensor data 1402a and 1402b (collectively 1402) to generate differential image data for spot detection as localized x,y coordinates. The process 1400, which may be software executed by a processor on the camera system, may detect a pulsed radiation source spot in the sensor data by subtracting the successive sensor data frames 1402 at step 1404. For example, data frame 1402a may be subtracted from data frame 1402b to determine if an IR spot is collected by the imaging sensor in either data frame 1402a or 1402b. Step 1404 enables isolation of coordinates on the imaging sensor (i.e., x,y pixel(s)) that are illuminated by the spot. Detectors on the imaging sensor may provide relative energy from each spot. Because of the asynchronousness between the pulsed radiation source and frame rate of the imaging sensor, the pulsed radiation source spot will not be present in every image frame, which allows the camera to reduce false alarms from other hot objects (i.e., IR sources near the pulsed radiation source spot).

At step 1406, a determination may be made as to whether a spot of a pulsed radiation source was detected in the successive sensor data frames 1402. If a spot is detected, then a spot detection parameter may be set to logical 'true' or '1.' Otherwise, if no spot is detected between successive sensor data frames 1402, then the spot detection parameter may be set to logical 'false' or '0.' The spot detection parameter may be included in a frame spot array or vector (or matrix) that accumulates when spots are detected. At step 1408, a determination is made as to whether a last image frame has been captured that meets the minimum wait time or some other amount of time that is determined to enable tracking and identification of a pulsed radiation source.

At step 1410, after completion of the image frames over a given time period, the detection array of N-values ('1' for detection, '0' for no detection) may be used to start a track file for the pulsed radiation source detected in the sensor data for N-frames total, where N may be greater than or equal to 300 and less than or equal to 500. Other numbers of frames may be utilized in accordance with the principles of the present invention. At step 1412, a detection array, which may be the same or different from the frame spot array generated by looping through step 1406, of N-values for tracking multiple pulsed radiation sources is generated. As with the frame spot array, the detection array may include a "1" for detection and "0" for no detection of a corresponding spot for respective pulsed radiation sources being tracked. The output or detect array may be stored in memory of the camera. Starting at step 1414, zero run length statistics may be determined in an effort to identify a unique PRF code of the pulsed radiation source being tracked. At step 1414, the detection array may be scanned for sequences of no detections, and the length of each sequence of no detections (e.g., series of '0's in the detection array) may be stored in another array, L array. Each length of zero detection frames may be saved in memory 1416.

At step 1418, maximum and minimum zero run length array may be determined. At step 1420, which may be simultaneously performed with step 1418, a histogram of a first four results of the zero run length array may be determined and stored in memory 414. A maximum of the histogram of the zero run length array may be created at step 1422, and a number of histogram bins of the zero run length array may be determined at step 1424. At step 1426, the maximum of the histogram of the zero run length array may be determined, and number of histogram bins of the zero run length array may be determined at step 1426. At step 1428, a feature vector tree/lookup table may be used to look-up a PRF code 1430 that matches the zero run length array statistics and further used to determine the PRF code 1430 of the pulsed radiation source that is being tracked by the camera.

Although the process 1400 of FIG. 14 is configured to track a single pulsed radiation source, it should be understood that the process 1400 may be configured in such a way as to track multiple pulsed radiation sources simultaneously, as indicated by dashed feedback line 1432. After a last frame is determined to be taken at step 1408, the process 1400 in step 1410 focuses on pixels within the area that the spot was detected. However, the process 1400, as provided by feedback line 1432, may continue to repeat steps 1404 and 1406 for each pair of MWIR images 1402 (i.e., pair of frames of image data) as additional image frames are collected to perform step 1410. The image frames collected to perform step 1410 may simultaneously be used to identify and track other pulsed radiation sources if in the field-of-view of the camera.

Figure 15:
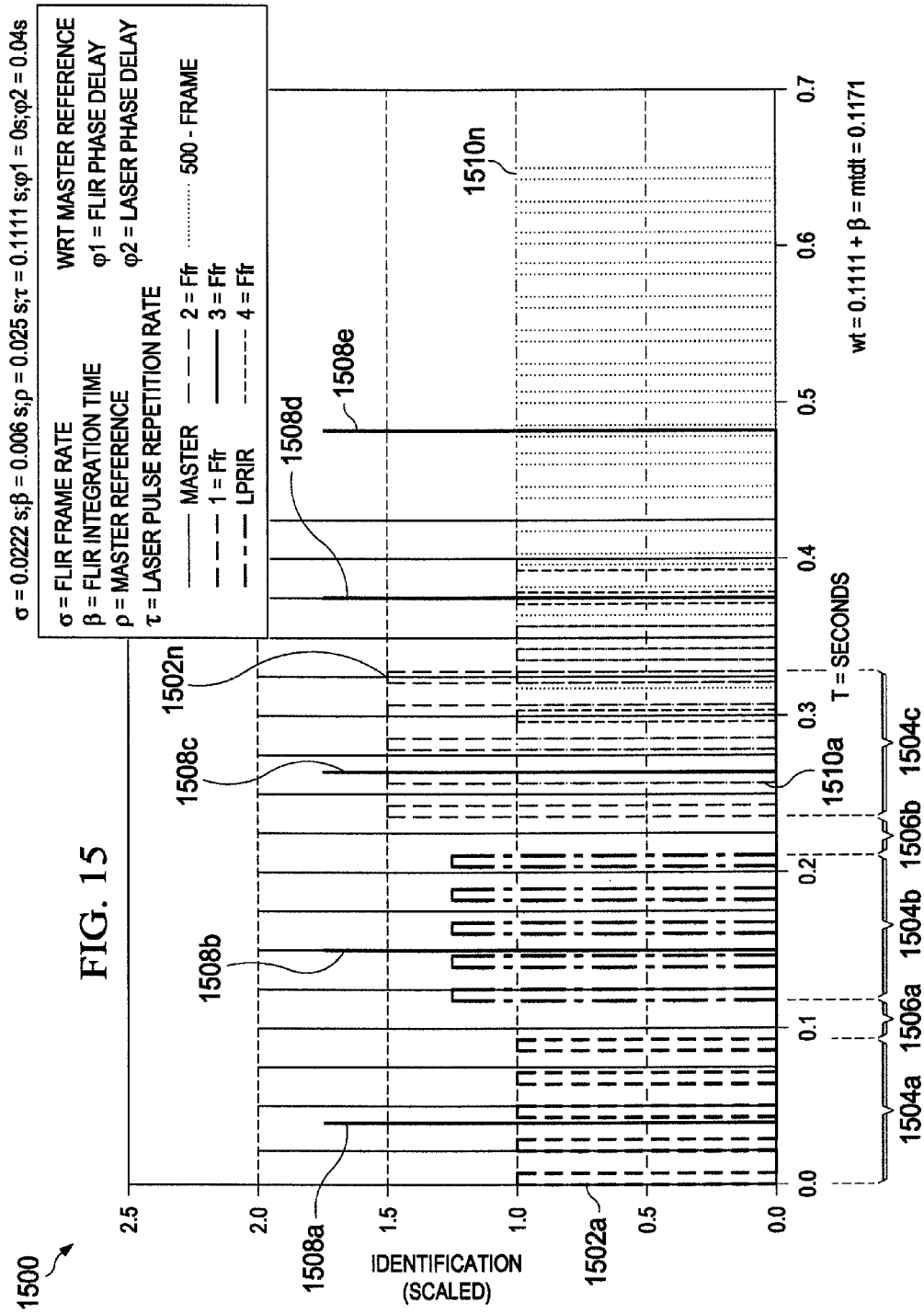
FIG. 15 is a graph of an illustrative IR frame window signal for use in detecting a pulse repetition rate signal of a pulsed radiation source using the smallest or optimal wait times for each of the optimal IR frame rates.

With regard to FIG. 15, a graph 1500 showing illustrative detection of spots from a pulsed radiation source using an imaging sensor is shown. The graph 1500 includes three sets of integration windows 1504a, 1504b, and 1504c (collectively 1504) of an imaging sensor of a camera. During the integration windows 1504, which are shown as pulses having a frame rate of approximately 45 Hz and integration time of 6 ms, pixel detectors that are being illuminated by photons in a field-of-view of optics of the camera may sense an optical image of a scene and/or spots of a pulsed radiation source. For the example shown, the PRF of the pulsed radiation source is approximately 9 Hz. Between each of the sets of integration windows 1504a, 1504b, and 1504c, a phase delay of one integration time (e.g., 6 ms) is added. It should be understood that alternative integration times may be used.

In operation, and as shown in the graph 1500, there are two missed spot events 1508a 1508b, which indicates that the pulsed radiation source pulsed outside of an integration time of the imaging sensor, and are, therefore, not detected. A detected spot event 1508c occurs within an integration window 1510a of the imaging sensor, and is, therefore, detected. From the integration window 1510a and beyond for a certain time period, integration windows 1510a-1510n are performed on a periodic basis, as opposed to the sets of integration windows 1504 that have a more limited wait time and then have a phase delay before a next set (using the process 1300 of FIG. 13), to determine whether the parameters of the camera are able to be used to detect, track, and identify the pulsed radiation source. As shown by spot events 1508d and 1508e, the spot events fall within integration windows 1510, which means that there is a high degree of likelihood that the parameters of the camera can be used to determine the pulsed radiation source. It should be noted that if the spot events 1508d and 1508e do not occur within the integration windows 1510, then it is determined that the parameters of the camera are not aligned with the pulse repetition rate of the pulsed radiation source, and the process of FIG. 13 would repeat until the correct parameters are used to identify the PRF code.

The magnitude of the spot(s) may be a sum of all of the pixels in a tight spot neighborhood that exceeds a threshold value. In one embodiment, a Gaussian spot detection mathematical algorithm may be utilized to determine the spot size. Other spot detection mathematical algorithms may be utilized, as understood in the art. Resulting digital data arrays (one for each spot) may include measurements of energy of either the spot or the background.

In determining a unique PRF code, measurement parameters may be generated, as described with regard to FIG. 14. Eight illustrative features or statistics are identified in TABLE III, and include ZRL maximum, ZRL count, ZRL minimum, max counts, and histogram values. These features have been found to be sufficient to allow for unique identification of all 448 PRF codes. A reduced set of features (right-hand column of TABLE II) may alternatively be utilized to determine PRF codes.

TABLE II

| | ZRL-Based Feature Set | |
|---|---|---|
| Feature | 12-Unique | Reduced Set |
| ZRLmax | x | x |
| ZRLcnt | x | x |
| ZRLmin | x | |
| maxCounts | x | x |
| nzBinsVal(1) | x | x |
| nzBinsVal(2) | x | |
| nzBinsVal(3) | x | x |
| nzBinsVal(4) | x | |

As an example of the pulsed radiation source detection process 1400 described in FIG. 14, TABLE III shows illustrative results for 100-frames of image data. As understood in the art, pulsed radiation sources are generally separated by a minimum of 0.01 Hz. In one embodiment, the frame count starts with a spot detection of a pulsed radiation source. When a spot of the pulsed radiation source is detected in a frame of image data, a '1' is recorded, and when a spot of the pulsed radiation source is not detected in a frame of image data, a '0' is recorded. Once n-frames of image data are collected and output at step 1410, the rest of the process begins to determine zero run length statistics.

TABLE II

Spot Detections and No Detections

| Frame # | Detect/No Detect |
|---|---|
| 1 | 1 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 1 |
| 12 | 0 |
| 13 | 0 |
| 14 | 0 |
| 15 | 0 |
| 16 | 0 |
| 17 | 0 |
| 18 | 0 |
| 19 | 0 |
| 20 | 0 |
| 21 | 0 |
| 22 | 0 |
| 23 | 0 |
| 24 | 0 |
| 25 | 0 |
| 26 | 0 |
| 27 | 0 |
| 28 | 1 |
| 29 | 0 |
| 30 | 0 |
| 31 | 0 |
| 32 | 0 |
| 33 | 0 |
| 34 | 0 |
| 35 | 0 |
| 36 | 0 |
| 37 | 0 |
| 38 | 0 |
| 39 | 0 |
| 40 | 0 |
| 41 | 0 |
| 42 | 0 |
| 43 | 0 |
| 44 | 0 |
| 45 | 0 |
| 46 | 0 |
| 47 | 0 |
| 48 | 0 |
| 49 | 0 |
| 50 | 0 |
| 51 | 0 |
| 52 | 0 |
| 53 | 0 |
| 54 | 0 |
| 55 | 1 |
| 56 | 0 |
| 57 | 0 |
| 58 | 0 |
| 59 | 0 |
| 60 | 0 |
| 61 | 0 |
| 62 | 0 |
| 63 | 0 |
| 64 | 0 |
| 65 | 0 |
| 66 | 0 |
| 67 | 0 |
| 68 | 0 |
| 69 | 0 |
| 70 | 0 |
| 71 | 0 |

TABLE II-continued

Spot Detections and No Detections

| Frame # | Detect/No Detect |
|---|---|
| 72 | 1 |
| 73 | 0 |
| 74 | 0 |
| 75 | 0 |
| 76 | 0 |
| 77 | 0 |
| 78 | 0 |
| 79 | 0 |
| 80 | 0 |
| 81 | 0 |
| 82 | 1 |
| 83 | 0 |
| 84 | 0 |
| 85 | 0 |
| 86 | 0 |
| 87 | 0 |
| 88 | 0 |
| 89 | 0 |
| 90 | 0 |
| 91 | 0 |
| 92 | 0 |
| 93 | 0 |
| 94 | 0 |
| 95 | 0 |
| 96 | 0 |
| 97 | 0 |
| 98 | 0 |
| 99 | 1 |
| 100 | 0 |

TABLE III shows illustrative results of counting the number of zeros between spot detections. The number of zeros between spot detections defines a zero run length (ZRL) value for each contiguous group of zeros (i.e., a run of zeros) in the 100-frames of image data shown in TABLE II. The count of 0's between 1's (left column of TABLE III) shows the number of frames of 0's (i.e., no spots detected) between each of the frames of 1's (i.e., spot detected). For example, because a spot was detected in frame 1, there are 0 spots between a previous frame that detected a spot. Thereafter, 9 frames (frames 2-10) of no spot detections occurred. Between the next frame in which a spot was detected (i.e., frame 11), 16 frames (i.e., frames 12-27) passed without a spot being detected, and so on. The right-hand column of TABLE III shows zero run length counts in order encountered (i.e., the left-hand column without any 0's). In other words, the ZRL count is 9 between the first two frames with spots, then 16, 26, 16, 9, and 16.

TABLE III

ZRL Statistics

| Count of 0's Between 1's | ZRL Counts (in Order Encountered) |
|---|---|
| 0 | 9 |
| 9 | 16 |
| 0 | 26 |
| 16 | 16 |
| 0 | 9 |
| 26 | 16 |
| 0 | |
| 16 | |
| 0 | |
| 9 | |
| 0 | |
| 16 | |
| 0 | |
| 0 | |

The length of ZRLs varies as a function of the pulse repetition rate of the pulsed radiation source, the frame rate of the imaging sensor, the frame integration time, and a total number of frames in a frame data set.

A feature set may be derived from the contents of the right-hand column of TABLE III. The features in the feature set separate the 448 PRF codes of pulsed radiation sources may be defined as:

(1) The maximum value of ZRL, in this example 26 (i.e., 26 is the highest number in the right-hand column of TABLE III).

(2) The minimum value of ZRL, in this example 9.

(3) The count or histogram bins of the total number of zero runs or spots detected in different frames of image data, in this example 6 (i.e., the set including 9, 16, 26, 19, 9, 16 is a set size having a total number of zero runs equal to 6).

A histogram approach may be used to determine a count of each value determined by the feature set. Since the number of different values can vary with each set of input parameters (e.g., frame rate and integration window of the imaging sensor), the histogram approach provides a relatively simple way to accumulate a count of the number of identical values from the ZRL statistics (see TABLE III, right-hand column). An illustrative truncated histogram is shown in TABLE IV.

TABLE IV

| Histogram of ZRL Counts | | | | | | | | | | | | | | | | | | |
|---|---|---|---|---|---|---|---|---|---|---|---|---|---|---|---|---|---|---|
| Value | 1 | 2 | ... | 8 | 9 | 10 | 11 | 12 | 13 | 14 | 15 | 16 | 17 | 18 | ... | 24 | 25 | 26 | 27 | ... |
| Count | 0 | 0 | 0 | 0 | 2 | 0 | 0 | 0 | 0 | 0 | 0 | 3 | 0 | 0 | 0 | 0 | 0 | 1 | 0 | ... |

Extracting non-zero values from the histogram of TABLE IV provides two of the five features of the ZRL statistics (i.e., max of histogram and # of histogram bins). In addition, the maximum counts feature is also included in the results shown in TABLE III. The above process for determining ZRL statistics and feature set may be used for tracking and identifying PRF codes from one or more pulsed radiation sources simultaneously.

Figure 16:
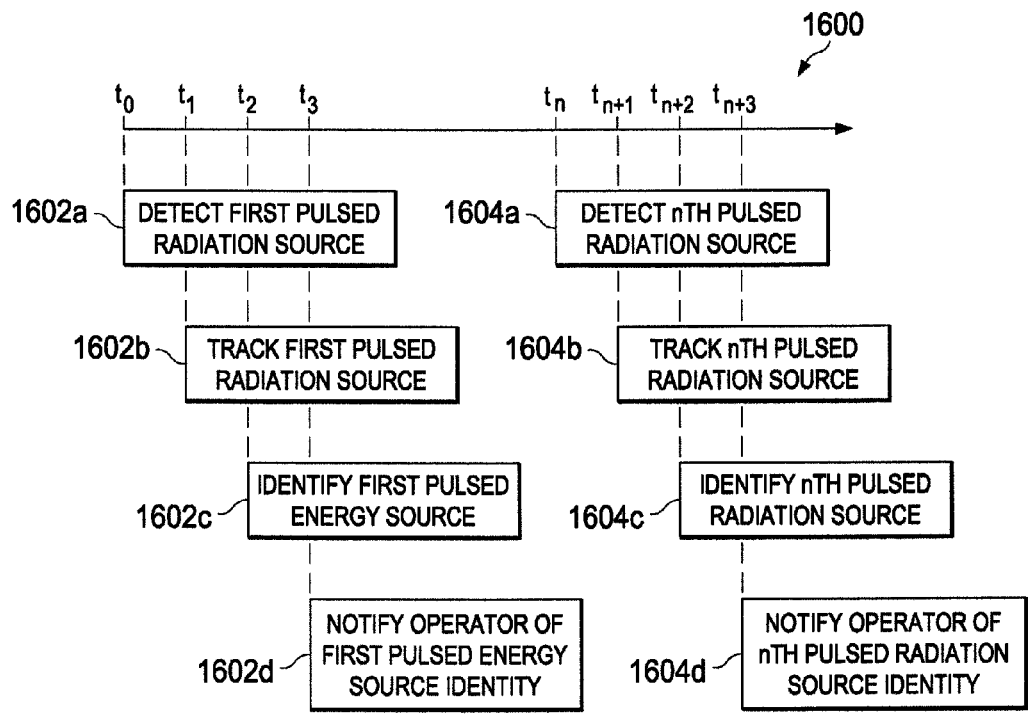
FIG. 16 is a timing diagram of an illustrative process for detecting, tracking, and identifying multiple pulsed radiation sources within a field-of-view of the camera.

With regard to FIG. 16, a timeline showing process 1600 for simultaneously tracking and identifying PRF codes from one or more pulsed radiation sources. The process 1600 starts at time $T_0$, where a first pulsed radiation source is detected at step 1602a. At step 1602b, the first pulsed radiation source is tracked. In tracking the pulsed radiation source, a region of pixels local to a spot of the pulsed radiation source is identified and monitored for additional spots to be detected. At step 1602c, first pulse radiation source is identified by its PRF code. In one embodiment, zero run length statistics may be used to determine a specific PRF code. At step 1602d, an operator or user may be notified of the first pulsed radiation source identity. By identifying the PRF code, the user can determine a type of pulsed radiation source that is being used for targeting purposes. In addition to identifying the pulsed radiation source, the user may be presented with a specific target that is being illuminated by the pulsed radiation source. Still yet, the user may be presented with information associated with the PRF code, such as weapon type or other related information that uses a pulsed radiation source with a particular PRF code.

Continuing with FIG. 16, the process 1600 includes detecting an $n^{th}$ pulsed radiation source at step 1604a starting at time $T_n$. It should be understood that one or more other pulsed radiation sources may be tracked between detecting the first and $n^{th}$ pulsed radiation sources. Steps 1604b, 1604c, and 1604d are the same or analogous to steps 1602b, 1604c, and 1604d, but using pixels that are being intermittently illuminated by the $n^{th}$ pulsed radiation source. As described with regard to FIG. 14, a Gaussian spot detection mathematical algorithm may be utilized to identify spots of the pulsed radiation sources.

Figure 17A:
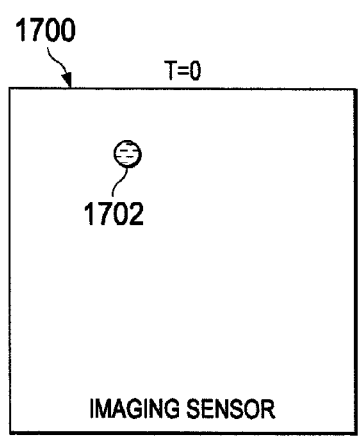
FIGS. 17A and 17B are illustrations of illustrative targets that are being tracked by an imaging sensor within the field-of-view of a camera.
Figure 17B:
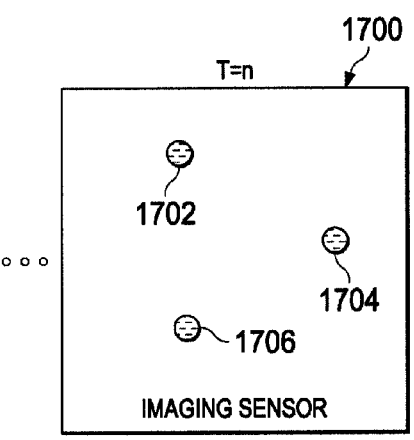

FIGS. 17A and 17B are illustrations of an imaging sensor 1700 at times T=0 and T=n. At time T=0, the imaging sensor is sensing a spot 1702 being generated by a pulsed radiation source. The spot 1702 may occur periodically or aperiodically depending on a phase difference between the pulsed radiation source and sensor parameters. As described above, a track file is initiated when a spot of a pulsed radiation source is detected by monitoring pixels (e.g., 5×5 pixel matrix) local to pixel(s) that initially sensed a spot. In one embodiment, coordinates of the pixels on the imaging sensor 1700 that are sensing the spot of the pulsed radiation source may be determined and presented to the user. In another embodiment, rather than using the coordinates of the pixels on the imaging sensor 1700, geographic coordinates that are being imaged onto the imaging sensor 1700 may be presented to the user. The geographic coordinates of a scene may be established using a variety of techniques, as understood in the art.

With regard to FIG. 17B, the imaging sensor 1700 may be sensing spots 1702, 1704, and 1706 of multiple respective pulsed radiation sources at time T=n. Although shown as spots being sensed at the same time, it should be understood that the spots 1702, 1704, and 1706 may be sensed at different times during a time window in which multiple pulsed radiation sources are illuminating targets within a scene being projected onto the imaging sensor 1700. During the time window, different frames of image data captured during integration times of the imaging sensor 1700 may capture the spots at different pixels within the imaging sensor 1700.

Figure 18A:
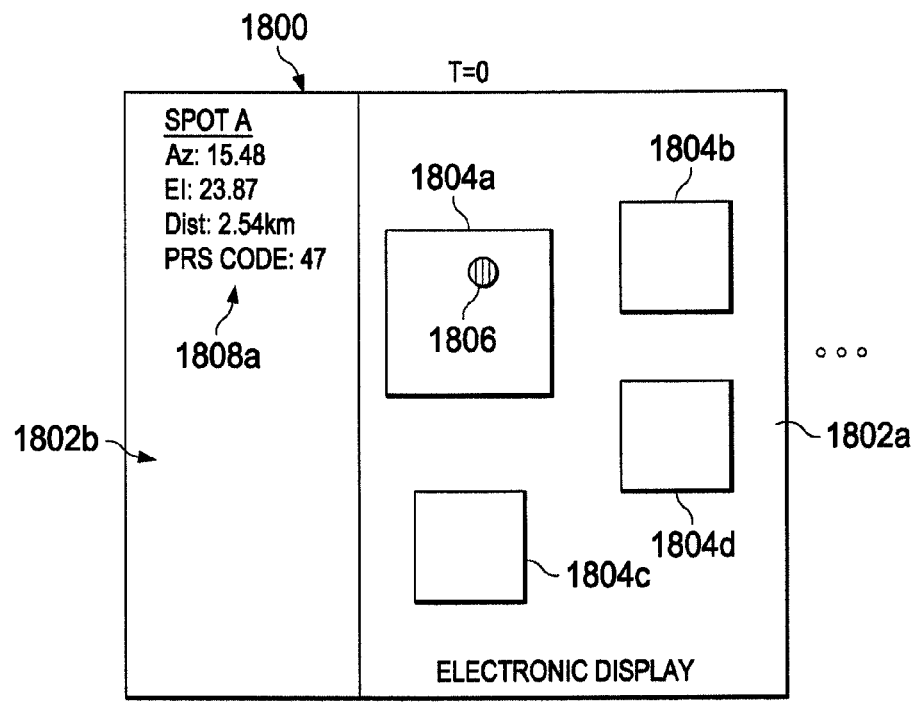
FIGS. 18A and 18B are screen shots of illustrative images of a scene when tracking a single and multiple radiation sources, respectively.
Figure 18B:
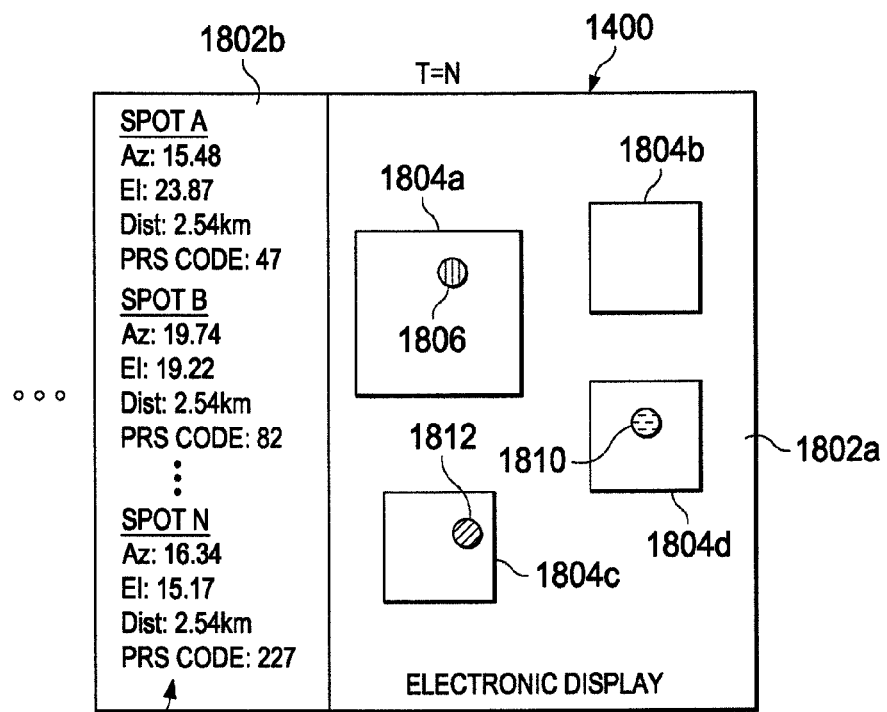

With regard to FIGS. 18A and 18B, an electronic display 1800 that is part of the camera for a user to view is shown. The electronic display 1800 may display two portions, a scene portion 1802a and information portion 1802b. The scene portion 1802a shows an optical representation of a scene that is being imaged onto the imaging sensor, where the scene includes structures 1804a, 1804b, 1804c, and 1804d (collectively 1804). Overlaying the scene displayed on the electronic display 1800 is a graphical spot representation 1806 (Spot A) of the spot 1702 being imaged onto the imaging sensor 1700 (FIG. 17).

Within the information portion 1802b of the electronic display 1800 is information 1808 associated with the graphical spot representation 1806. The information 1808a may include coordinate information, such as azimuth coordinate (az), elevation (el) coordinate, distance, and PRF code or pulsed radiation source type. In addition to displaying PRF code or pulsed radiation source type, a weapons system with which the PRF code or pulsed radiation source type may be identified by searching or cross-referencing a table that includes weapons systems indexed by PRF code and/or pulsed radiation source type. An identification of the weapon type may be displayed with or as an alternative to displaying the PRF code. The identification may be displayed as a name (e.g., Hellfire Missile) or graphical representation (e.g., graphic of a helicopter) to provide the user of the camera with sufficient information to determine the type of weapons system or vehicle carrying the weapons system with the pulsed radiation source. TABLE V shows cross-referencing information for determining a weapons type from a PRF code.

TABLE V

PRF Code and Associated Weapon System

| PRF Code | Weapon Type |
| --- | --- |
| 1 | Hellfire Missile System |
| 2 | TOW Weapons System |
| ... | ... |
| 448 | Tomahawk Missile System |

With regard to FIG. 18B, in the same manner as shown in FIG. 18A, graphical spot representation 1806 is shown in addition to other graphical spot representations 1810 and 1812, which is indicative of three pulsed radiation sources being tracked. As shown, each of the graphical spot representations 1806, 1810, and 1812 have different patterns to alert a user that the spots are being sourced by pulsed radiation sources having different PRF codes. In electronic display portion 1808b, coordinate information of the spots 1806, 1810, and 1812 may be displayed for the user to view.

Once the PRF code is identified, the camera may be configured to provide visual, audible, vibration, or other indication that one or more pulsed radiation sources are being tracked. If the camera is configured to recognize an enemy PRF code, then the camera may be configured to notify the user with one or more possible alerts of an enemy weapons system being within an area in which the camera can identify the enemy's PRF code, especially if the power levels are high enough to determine that the location in which the user is located is being directly targeted. The alerts or counter-measures may include an audible, visual, sensory (e.g., vibration), or other alert type to notify the user of the enemy PRF code.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for identifying a pulsed radiation source, said system comprising:
 an imaging sensor having a frame rate that is asynchronous with a pulse repetition frequency (PRF) of the pulsed radiation source; and
 a processing unit in communication with said imaging sensor, and configured to:
  process a sequence of image data of a scene captured by said imaging sensor to determine whether radiation of the pulsed radiation source is detected;
  determine a PRF code of the pulsed radiation source from possible multiple different PRF codes based on the processed sequence of image data; and
  notify a user of the PRF code or information associated with the PRF code.

2. The system according to claim 1, wherein said processing unit is further configured to cause said imaging sensor to operate at the frame rate and use an integration window, and process the sequence of image data over a number of image frames for a data acquisition time.

3. The system according to claim 2, wherein said processing unit is further configured to determine whether radiation of the pulsed radiation source is detected or not detected in each of the frames during the data acquisition time.

4. The system according to claim 3, wherein said processing unit is further configured to determine a set of unique features based on determining whether the radiation of the pulsed radiation source is detected or not detected in the image frames captured by said imaging sensor.

5. The system according to claim 1, wherein said processing unit is further configured to determine geographic coordinates of an object from which the radiation of the pulsed radiation source is being captured by said imaging sensor.

6. The system according to claim 5, wherein said processing unit is further configured to detect radiation from a second pulsed radiation source while determining the PRF code of the pulsed radiation source.

7. The system according to claim 6, wherein said processing unit is further configured to establish geographic coordinates of the second pulsed radiation source.

8. The system according to claim 1, wherein said imaging sensor is configured with a field-of view greater than approximately five degrees.

9. The system according to claim 1, further comprising a user interface that is configured to enable a user to set frame rate and integration window for a number of frames over a minimized wait time to process the sequence of image data.

10. The system according to claim 1, wherein said processing unit, in notifying the user of information associated with the PRF code, is further configured to display an identification of a weapons system from which the pulsed radiation source having the PRF code.

11. A method for identifying a pulsed radiation source, said method comprising:
 processing a sequence of image data of a scene to determine whether radiation of the pulsed radiation source is detected, the sequence of image data obtained using an imaging sensor having a frame rate that is asynchronous with a pulse repetition frequency (PRF) of the pulsed radiation source;
 determining a PRF code of the pulsed radiation source from multiple possible different PRF codes based on the processed sequence of image data; and
 presenting the determined PRF code or information associated with the PRF code to a user.

12. The method according to claim 11, further comprising using a frame rate and integration window for capturing the image data, and processing the sequence of image data over a number of image frames for a data acquisition time.

13. The method according to claim 12, further comprising determining whether radiation of the pulsed radiation source is detected or not detected in each of the frames during the data acquisition time.

14. The method according to claim 13, further comprising determining a set of unique features based on determining whether radiation of the pulsed radiation source is detected or not detected in the captured image frames.

15. The method according to claim 11, further comprising determining geographic coordinates of an object from which the radiation of the pulsed radiation source is being captured by said imaging sensor.

16. The method according to claim 15, further comprising detecting radiation from a second pulsed radiation source while determining the PRF code of the pulsed radiation source.

17. The method according to claim 16, further comprising establishing geographic coordinates of the second pulsed radiation source.

18. The method according to claim 11, further comprising capturing the image data using a field-of-view that is greater than approximately five degrees.

19. The method according to claim 11, further comprising providing a user interface configured to enable a user to set frame rate and integration window for a number of frames over a minimized wait time to process the sequence of image data.

20. The method according to claim 11, further comprising displaying an identification of a weapons system from which the pulsed radiation source having the PRF code in notifying the user of information associated with the PRF code.

* * * * *